(12) United States Patent
Hsu et al.

(10) Patent No.: US 8,271,229 B2
(45) Date of Patent: Sep. 18, 2012

(54) WEIGHT ESTIMATION FOR EXCAVATOR PAYLOADS

(75) Inventors: Hsin Pai Hsu, Auckland (NZ); Jennifer Carol King, Auckland (NZ); Paul John Corder, Auckland (NZ)

(73) Assignee: Actronic Limited, Auckland (NZ)

( * ) Notice: Subject to any disclaimer, the term of this patent is extended or adjusted under 35 U.S.C. 154(b) by 1070 days.

(21) Appl. No.: 12/121,232

(22) Filed: May 15, 2008

(65) Prior Publication Data

US 2008/0319710 A1 Dec. 25, 2008

Related U.S. Application Data

(60) Provisional application No. 60/938,542, filed on May 17, 2007.

(30) Foreign Application Priority Data

May 15, 2007 (NZ) ........................................ 555187

(51) Int. Cl.
*G01G 19/14* (2006.01)
(52) U.S. Cl. ........................................................ 702/174
(58) Field of Classification Search .................. 701/174; 702/174

See application file for complete search history.

(56) References Cited

U.S. PATENT DOCUMENTS

| | | | |
|---|---|---|---|
| 4,044,610 A | 8/1977 | Oldaeus et al. | |
| 4,499,960 A | 2/1985 | Ehrich et al. | |
| 4,627,013 A | 12/1986 | Ichiyama et al. | |
| 4,809,794 A | 3/1989 | Blair et al. | |
| 4,919,222 A | 4/1990 | Kyrtsos et al. | |
| 5,067,572 A | 11/1991 | Kyrtsos et al. | |
| 5,070,953 A | 12/1991 | Kyrtsos et al. | |
| 5,082,071 A | 1/1992 | Kyrtsos et al. | |
| 5,105,896 A | 4/1992 | Kyrtsos | |
| 5,178,226 A | 1/1993 | Bowman et al. | |
| 5,220,968 A | 6/1993 | Weber | |
| 5,509,293 A | 4/1996 | Karumanchi | |
| 5,929,389 A | 7/1999 | Keuper | |
| 6,378,653 B1 * | 4/2002 | Takahashi | 182/69.4 |
| 6,518,519 B1 | 2/2003 | Crane, III et al. | |
| 6,552,279 B1 | 4/2003 | Lueschow et al. | |
| 6,601,013 B2 | 7/2003 | Lueschow et al. | |
| 6,868,364 B2 | 3/2005 | Allerding et al. | |

FOREIGN PATENT DOCUMENTS

| | | |
|---|---|---|
| WO | 2006098218 | 9/2006 |
| WO | 2006098645 | 9/2006 |

* cited by examiner

*Primary Examiner* — Cindy H Khuu

(74) *Attorney, Agent, or Firm* — Dann, Dorfman, Herrell and Skillman, P.C.

(57) ABSTRACT

A method for estimating weight of a payload held by load lifting machine 1, wherein the load lifting machine comprises lifting linkage with a boom 5 pivotably connected to a machine chassis 2, the method comprising calculating an estimation using the torque of the boom 5, torque of the boom during calibration lifts for first and second payloads, and dynamic torque adjustment determined for first and second payloads.

36 Claims, 13 Drawing Sheets

Lift 1

Lift 2

Lift 3

Lift 4

Lift 5

Lift 1

Lift 2

Lift 3

Lift 4

WEIGHT ESTIMATION FOR EXCAVATOR PAYLOADS

CROSS REFERENCE TO RELATED APPLICATION

This application claims the benefit of U.S. Provisional Application No. 60/938,542, filed May 17, 2007, the entirety of which is incorporated herein by reference.

FIELD OF THE INVENTION

The present invention relates to weight estimation methods and apparatus for use with load lifting devices.

BACKGROUND OF THE INVENTION

It is important to be able to estimate the pay load of a load lifting machine, such as an excavator, to avoid the overfilling of load transportation vehicles, such as trucks. Overfilling may damage vehicles, may damage roadways and on public roadways, can incur overweight fines.

An excavator is one type of a load lifting machine that is adapted for digging and manoeuvring material, including moving material into the trailer portion of a truck. An excavator typically comprises a chassis that can rotate or slew on a carriage. The carriage comprises self laying tracks or similar for enabling movement of the excavator. A boom, stick and bucket or other load holder extend from the chassis. The relative angles and extensions of the boom, bucket and stick can be manipulated by an operator in order to manoeuvre the bucket to scoop up material, move material and deposit material as required.

The boom is coupled to the chassis by a pivotable joint. An actuator moves the boom relative to the chassis. A stick is attached to the end of the boom by another pivotable joint. A second actuator moves the stick relative to the boom. The bucket or other load holder is attached to the end of the stick by a further pivotable joint. A third actuator moves the bucket relative to the stick. In use, the bucket carries the pay load.

To estimate the payload of an excavator, it is necessary to estimate the weight of material in the bucket or other load holder. Certain types of excavators might have inbuilt weighing apparatus for this purpose. However, it is also desirable to have apparatus that can be retrofitted to existing excavators that do not have weight estimation capability.

SUMMARY OF THE INVENTION

It is the object of the invention to provide a method and apparatus for estimating the payload in a load holder of a load lifting machine.

In one aspect the present invention may be said to consist in a method for estimating weight of a payload held by load lifting machine, wherein the load lifting machine comprises lifting linkage with a boom pivotably connected to a machine chassis, a stick pivotably connected to the boom and a load holder for a payload pivotably connected to the stick, the boom, stick and load holder being moveable into a range of boom, stick and load holder angles, the method comprising the steps of: a) at a first linkage geometry: i) determining a first torque parameter being a torque or a parameter indicative of torque between the boom and the chassis during boom movement, and ii) determining a current boom angle, a current stick angle and a current load holder angle, iii) determining a second torque parameter being a torque or a parameter indicative of a torque between the boom and the chassis that is generated by acceleration of the centre of mass of the lifting linkage when the load holder has a first payload, and iv) determining a third torque parameter being a torque or a parameter indicative of a torque between the boom and the chassis that is generated by acceleration of the centre of mass of the lifting linkage when the load holder has a second payload, b) estimating a payload weight by: i) determining a relationship between the first torque parameter and at least two corresponding calibration torque parameters determined during a calibration process, each corresponding calibration torque parameter being a torque or a parameter indicative of torque between the boom and the chassis at the current boom, stick and load holder angles, wherein determining the relationship further comprises compensating for the torque generated by acceleration of the centre of mass of the lifting linkage using the second and third determined torque parameters, and ii) using the relationship and a mass of a calibration payload to calculate a payload weight estimation.

Preferably the method comprises determining a tilt angle of the chassis, and adjusting the determined boom, stick and bucket angles to compensate for the tilt angle.

Preferably, the boom, stick and load holder angles are measured by one or more angle sensors, or one or more of the boom, stick and load holder angles are determined or calculated from other parameters.

Preferably, there is a first and second corresponding calibration torque parameter determined during a calibration process, wherein the first corresponding calibration torque parameter is a torque or a parameter indicative of torque between the boom and the chassis at the current boom, stick and load holder angles during a calibration process with the first payload in the load holder, and wherein the second corresponding calibration torque parameter is a torque or a parameter indicative of torque between the boom and the chassis at the first boom, stick and load holder angles during a calibration process with the second payload in the load holder.

Preferably, the first payload has a mass less than the second payload or more preferably, the second payload is a full payload such that the load holder is loaded, and the first payload is an empty load holder wherein the load holder has no payload, or more preferably, the second payload is the calibration payload, or the second payload could have a mass less than the first payload.

Preferably, the method further comprising: c) at each of a plurality of further linkage geometries: i) determining a fourth torque parameter being a torque or a parameter indicative of torque between the boom and the chassis during boom movement, ii) determining a current boom angle, a current stick angle and a current load holder angle, iii) determining a fifth torque parameter being a torque or a parameter indicative of a torque between the boom and the chassis that is generated by acceleration of the centre of mass of the lifting linkage when the load holder has a first payload, and iv) determining a sixth torque parameter being a torque or a parameter indicative of a torque between the boom and the chassis that is generated by acceleration of the centre of mass of the lifting linkage when the load holder has a second payload, and d) estimating a payload weight by: i) determining a relationship between the fourth torque parameter and at least two corresponding calibration torque parameters determined during a calibration process, each corresponding calibration torque parameter being a torque or a parameter indicative of torque between the boom and the chassis at the current boom, stick and load holder angles, wherein determining the relationship further comprises compensating for the torque generated by acceleration of the centre of mass of the lifting linkage using the fifth and sixth determined torque parameters, and ii) using the relationship and a mass of a calibration payload to calculate a payload weight estimation, and e) calculating an average estimate payload weight.

Preferably, the method further comprising the steps of conducting a calibration process, the calibration process comprising the steps of: a) during conducting a plurality of calibration lifts with a first payload in the load holder, measuring a plurality of calibration torque parameters for the load holder with the first payload, each being a torque or a parameter indicative of torque between the boom and the chassis, each calibration torque parameter being measured at a boom, stick and load holder angle, b) determining a range of calibration torque parameters for a load holder with a first payload for a range of boom, stick and load holder angles from the plurality of measured calibration torque parameters for a load holder with a first payload, c) during conducting a plurality of calibration lifts with a second payload in the load holder, measuring a plurality of calibration torque parameters for the load holder with the second payload, each being a torque or a parameter indicative of torque between the boom and the chassis, each calibration boom parameter being measured at a boom, stick and load holder angle, and d) determining a range of calibration torque parameters for a load holder with a second payload for a range of boom, stick and load holder angles from the plurality of measured calibration torque parameters for a load holder with a first payload.

Preferably, the first payload has a mass less than the second payload or more preferably, the second payload is a full payload such that the load holder is loaded, and the first payload is an empty load holder wherein the load holder has no payload or more preferably, the second payload is the calibration payload or the second payload could have a mass less than the first payload.

Preferably, the method further comprises determining a range of calibration torque parameters for the loaded and the empty load holder comprises the steps of curve fitting the plurality of measured calibration torque parameters to a mathematical relationship relating torque parameters to boom, stick and load holder angles.

Preferably, the mathematical relationship is a sine wave.

Preferably, the boom angle is the angle between a line extending vertically perpendicularly from the chassis and a line extending through the longitudinal axis of the boom.

Preferably, the first boom angle is set as a trigger point for triggering the weight estimation calculation steps of the method, or a load holder position is a trigger point for triggering the weight estimation calculation steps.

Preferably, the boom angle is the relative angle between the boom and chassis or a parameter indicative of the relative orientations of the boom and chassis, or it is an absolute angle between the boom and vertical.

Preferably, the stick angle is the relative angle between the stick and boom or parameter indicative of the relative orientations of the stick and the chassis, or it is an absolute angle between the stick and vertical.

Preferably, the load holder angle is the relative angle between the load holder and stick or a parameter indicative of the relative orientations of the load holder and chassis.

Preferably, the parameters for determining calibration torque profiles are measured and/or determined from the calibration lifts.

Preferably, the method comprises adjusting the weight estimation for chassis tilt, using an indication of chassis tilt from a sensor.

Preferably, the weight estimate can be compensated for the effects of slew.

Preferably, the weight estimation method can be triggered when the bucket reaches a particular height.

In another aspect the invention may be said to consist in an apparatus for estimating weight of a load held by load lifting machine, wherein the load lifting machine comprises lifting linkage with a boom pivotably connected to a machine chassis, a stick pivotably connected to the boom and a load holder pivotably connected to the stick, the boom, stick and load holder being moveable into a range of relative boom, stick and load holder angles, the apparatus incorporated into or adapted to be installed on a load lifting machine and comprising: a processor, a first input coupled to the processor for receiving a signal indicative of a torque or a parameter indicative of or from which can be calculated torque between the boom and the chassis during boom movement, a boom angle input coupled to the processor for receiving a signal indicative of an angle between the boom and the machine chassis, a stick angle input coupled to the processor for receiving a signal indicative of an angle between the boom and the stick, and a load holder angle input coupled to the processor for receiving a signal indicative of an angle between the stick and the load holder, wherein the processor is adapted to detect movement of the boom, stick and/or load holder through a range of boom angles and is programmed to: a) at a first linkage geometry: i) determine a first torque parameter being a torque or a parameter indicative of torque between the boom and the chassis during boom movement from a signal on the first input, ii) determine a current boom angle, a current stick angle and a current load holder angle from signals on the boom, stick and load holder angle inputs, and iii) determine a second torque parameter being a torque or a parameter indicative of a torque between the boom and the chassis that is generated by acceleration of the centre of mass of the lifting linkage when the load holder has a first payload, and iv) determine a third torque parameter being a torque or a parameter indicative of a torque between the boom and the chassis that is generated by acceleration of the centre of mass of the lifting linkage when the load holder has a second payload, b) estimate a payload weight by: i) determining the relationship between the first torque parameter and at least two corresponding calibration torque parameters determined during a calibration process, each corresponding calibration torque parameter being a torque or a parameter indicative of torque between the boom and the chassis at the current boom, stick and load holder angles, wherein determining the relationship further comprises compensating for the torque generated by acceleration of the centre of mass of the lifting linkage using the second and third determined torque parameters, and ii) using the relationship and a mass of a calibration payload to calculate a payload weight estimation.

Preferably, the first payload has a mass less than the second payload, or more preferably, the second payload is a full payload such that the load holder is loaded, and the first payload is an empty load holder wherein the load holder has no payload, or more preferably, the second payload is the calibration payload, or the second payload could have a mass less than the first payload.

Preferably, wherein the apparatus further comprises a sensor coupled to the first input for sensing torque of the boom, or sensing a parameter from which torque can be calculated.

Preferably, wherein the apparatus further comprises angle sensors coupled to or for coupling to the boom, stick and load holder angle inputs for measuring the respective boom, stick and load holder angles, or the load holder angle could be determined in another manner.

Preferably, there is a first and second corresponding calibration torque parameter determined during a calibration process, wherein the first corresponding calibration torque parameter is a torque or a parameter indicative of torque between the boom and the chassis at the current boom, stick and load holder angles during a calibration process with a first payload in the load holder, and wherein the second corresponding calibration torque parameter is a torque or a parameter indicative of torque between the boom and the chassis at the first boom, stick and load holder angles during a calibration process with the calibration payload in the load holder.

Preferably, the processor is further programmed to: c) at each of a plurality of further linkage geometries: i) determine a fourth torque parameter being a torque or a parameter indicative of torque between the boom and the chassis during boom movement, ii) determine a current boom angle, a current stick angle and a current load holder angle, iii) determine a fifth torque parameter being a torque or a parameter indicative of a torque between the boom and the chassis that is generated by acceleration of the centre of mass of the lifting linkage when the load holder has a first payload, and iv) determine a sixth torque parameter being a torque or a parameter indicative of a torque between the boom and the chassis that is generated by acceleration of the centre of mass of the lifting linkage when the load holder has a second payload, d) estimate a payload weight by: i) determining a relationship between the first torque parameter and at least two corresponding calibration torque parameters determined during a calibration process, each corresponding calibration torque parameter being a torque or a parameter indicative of torque between the boom and the chassis at the current boom, stick and load holder angles, wherein determining the relationship further comprises compensating for the torque generated by acceleration of the centre of mass of the lifting linkage using the second and third determined torque parameters, and ii) using the relationship and a mass of a calibration payload to calculate a payload weight estimation, and e) calculate an average estimate payload weight.

Preferably, the first payload has a mass less than the second payload, or more preferably, the second payload is a full payload such that the load holder is loaded, and the first payload is an empty load holder wherein the load holder has no payload, or more preferably, the second payload is a calibration payload, or the second payload could have a mass less than the first payload.

Preferably, the apparatus further comprises an output device for displaying the calculated estimated weight.

Preferably, the boom angle is the relative angle between the boom and chassis or a parameter indicative of the relative orientations of the boom and chassis, or it is an absolute angle between the boom and vertical.

Preferably, the stick angle is the relative angle between the stick and boom or a parameter indicative of the relative orientations of the stick and the chassis, or it is an absolute angle between the stick and vertical.

Preferably, the load holder angle is the relative angle between the load holder and stick or an angle indicative of the relative orientations of the load holder and the chassis, or it is an absolute angle between the load holder and vertical.

Preferably, the parameters for determining calibration torque profiles are measured and/or determined from the calibration lifts.

Preferably, the method comprises adjusting the weight estimation for chassis tilt, using an indication of chassis tilt from a sensor.

Preferably, the weight estimate can be compensated for the effects of slew is based on information from sensors on the chassis.

Preferably, the weight estimation can be triggered when the bucket reaches a particular height.

In another aspect the invention may be said to consist in a method for estimating the weight of a payload held by load lifting machine, wherein the load lifting machine comprises lifting linkage with a boom pivotably connected to a machine chassis, a stick pivotably connected to the boom and a load holder pivotably connected to the stick, the boom, stick and load holder being moveable into a range of relative boom, stick and load holder angles, the method comprising the steps of calculating an estimation of a mass of a load held in the load holder using the equation:

$$M = \frac{(\tau - (\tau_e + \tau_{ae}))M_c}{(\tau_f + \tau_{af}) - (\tau_e + \tau_{ae})}$$

where M is the calculated estimated mass of the load, $\tau$ is measured torque of the boom at a first boom, stick and load holder angle, $\tau_e$ is the determined torque for an empty load holder at the first boom, stick and load holder angle, the torque being determined for an empty load holder for a range of boom, stick and load holder angles by curve fitting measured torque values, $\tau_{ae}$ is the determined torque adjustment for an empty load holder to compensate for the rate of change of the centre of mass during movement of the boom, $\tau_f$ is the determined torque for a loaded load holder at the first boom, stick and load holder angle, the torque being determined for an loaded load holder for a range of boom, stick and load holder angles by curve fitting measured torque values, $\tau_{af}$ is the determined torque adjustment for a loaded load holder to compensate for the rate of change of the centre of mass during movement of the boom $M_c$ is a mass of a calibration load.

Preferably, the load holder is a bucket.

Preferably, $\tau_e = A_{buckete} \sin(\theta_{bucket} - \theta_{0buckete} + \Delta\theta_{stick} + \Delta\theta_{boom}) + A_{sticke} \sin(\theta_{stick} - \theta_{0sticke} + \Delta\theta_{boom} + A_{boome} \sin(\theta_{boom} - \theta_{0boome}) + B_{boome}$ when the bucket is empty, or has other first payload mass.

Preferably, $\tau_f = A_{bucketf} \sin(\theta_{bucket} - \theta_{0bucketf} + \Delta\theta_{stick} + \Delta\theta_{boom}) + A_{stickf} \sin(\theta_{stick} - \theta_{0stickf} + \Delta\theta_{boom}) + A_{boomf} \sin(\theta_{boom} - \theta_{0boomf}) + B_{boomf}$ when the bucket is loaded, or has other second payload mass Preferably, $$\tau_{af} = \frac{\Delta\theta_{comf} A_{comf}^2}{(M_o + M_c)g^2}$$

where:
$\Delta\theta_{comf}$ is the change in angle of the centre of mass,
$A_{comf}$ is the amplitude of the centre of mass,
$M_o$ is the mass of the boom, stick and bucket without a load.

Preferably, $$\tau_{ae} = \frac{\Delta\theta_{come} A_{come}^2}{M_o g^2}$$

where:
$\Delta\theta_{come}$ is the change in angle of the centre of mass,
$A_{come}$ is the amplitude of the centre of mass.

Preferably, the parameters for determining calibration torque profiles are measured and/or determined from the calibration lifts.

Preferably, the method comprises adjusting the weight estimation for chassis tilt, using an indication of chassis tilt from a sensor.

Preferably, the weight estimate can be compensated for by slew based on information from sensors on the chassis.

Preferably, the weight estimation method can be triggered when the bucket reaches a particular height.

In another aspect the invention may be said to consist in a method for estimating weight of a payload held by load lifting machine, wherein the load lifting machine comprises lifting linkage with a boom pivotably connected to a machine chassis, the method comprising calculating an estimation using the torque of the boom, torque of the boom during calibration lifts for first and second payloads, and dynamic torque adjustment determined for first and second payloads.

In another aspect the invention may be said to consist in an apparatus for estimating weight of a payload held by load lifting machine, wherein the load lifting machine comprises lifting linkage with a boom pivotably connected to a machine chassis, the apparatus comprising processor adapted to calculating an estimation using the torque of the boom, torque of the boom during calibration lifts for first and second payloads, and dynamic torque adjustment determined for first and second payloads.

In another aspect the present invention may be said to consist in a method for estimating weight of a payload held by load lifting machine, wherein the load lifting machine comprises lifting linkage with a boom pivotably connected to a machine chassis, a stick pivotably connected to the boom and a bucket for a payload pivotably connected to the stick, the boom, stick and bucket being moveable into a range of boom, stick and bucket angles, the method comprising the steps of: a) at a first linkage geometry: i) determining a first torque parameter being a torque or a parameter indicative of torque between the boom and the chassis during boom movement, and ii) determining a current boom angle, a current stick angle and a current load holder angle, iii) determining a second torque parameter being a torque or a parameter indicative of a torque between the boom and the chassis that is generated by acceleration of the centre of mass of the lifting linkage when the load holder has a first payload, and iv) determining a third torque parameter being a torque or a parameter indicative of a torque between the boom and the chassis that is generated by acceleration of the centre of mass of the lifting linkage when the load holder has a second payload, b) estimating a payload weight by: i) determining a relationship between the first torque parameter and at least two corresponding calibration torque parameters determined during a calibration process, each corresponding calibration torque parameter being a torque or a parameter indicative of torque between the boom and the chassis at the current boom, stick and load holder angles, wherein determining the relationship further comprises compensating for the torque generated by acceleration of the centre of mass of the lifting linkage using the second and third determined torque parameters, and ii) using the relationship and a mass of a calibration payload to calculate a payload weight estimation.

In another aspect the present invention may be said to consist in a method for estimating weight of a payload held by load lifting machine, wherein the load lifting machine comprises lifting linkage with a boom pivotably connected to a machine chassis, a stick pivotably connected to the boom and a grapple for a payload pivotably connected to the stick, the boom, stick being moveable into a range of boom and stick angles, the method comprising the steps of: a) at a first linkage geometry: i) determining a first torque parameter being a torque or a parameter indicative of torque between the boom and the chassis during boom movement, and ii) determining a current boom angle and a current stick angle, iii) determining a second torque parameter being a torque or a parameter indicative of a torque between the boom and the chassis that is generated by acceleration of the centre of mass of the lifting linkage when the grapple has a first payload, and iv) determining a third torque parameter being a torque or a parameter indicative of a torque between the boom and the chassis that is generated by acceleration of the centre of mass of the lifting linkage when the grapple has a second payload, b) estimating a payload weight by: i) determining a relationship between the first torque parameter and at least two corresponding calibration torque parameters determined during a calibration process, each corresponding calibration torque parameter being a torque or a parameter indicative of torque between the boom and the chassis at the current boom and stick angles, wherein determining the relationship further comprises compensating for the torque generated by acceleration of the centre of mass of the lifting linkage using the second and third determined torque parameters, and ii) using the relationship and a mass of a calibration payload to calculate a payload weight estimation.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of". Related terms such as "comprise" and "comprised" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

Preferred embodiments of the invention will be described with reference to the following Figures, of which.

DETAILED DESCRIPTION OF PREFERRED EMBODIMENTS

A first embodiment of the invention relates to a method for calculating an estimation of the weight of a payload in a load holder of an excavator during a lift sequence. A first embodiment of the present invention also relates to an apparatus for carrying out the method. The apparatus comprises a processor and inputs for receiving signals from sensors. It optionally comprises the sensors themselves. The apparatus could be adapted to be retro-fitted to an excavator for enabling the calculation of a weight estimation of a payload. This enables payload weight estimation to be carried out in accordance with the invention in relation to an existing excavator that does not have any weight calculation functionality. Alternatively, the apparatus could be incorporated/built into an excavator at manufacture time. In the preferred embodiment, weight estimations can be output to a user as they operate the excavator in the normal manner.

Figure 1:
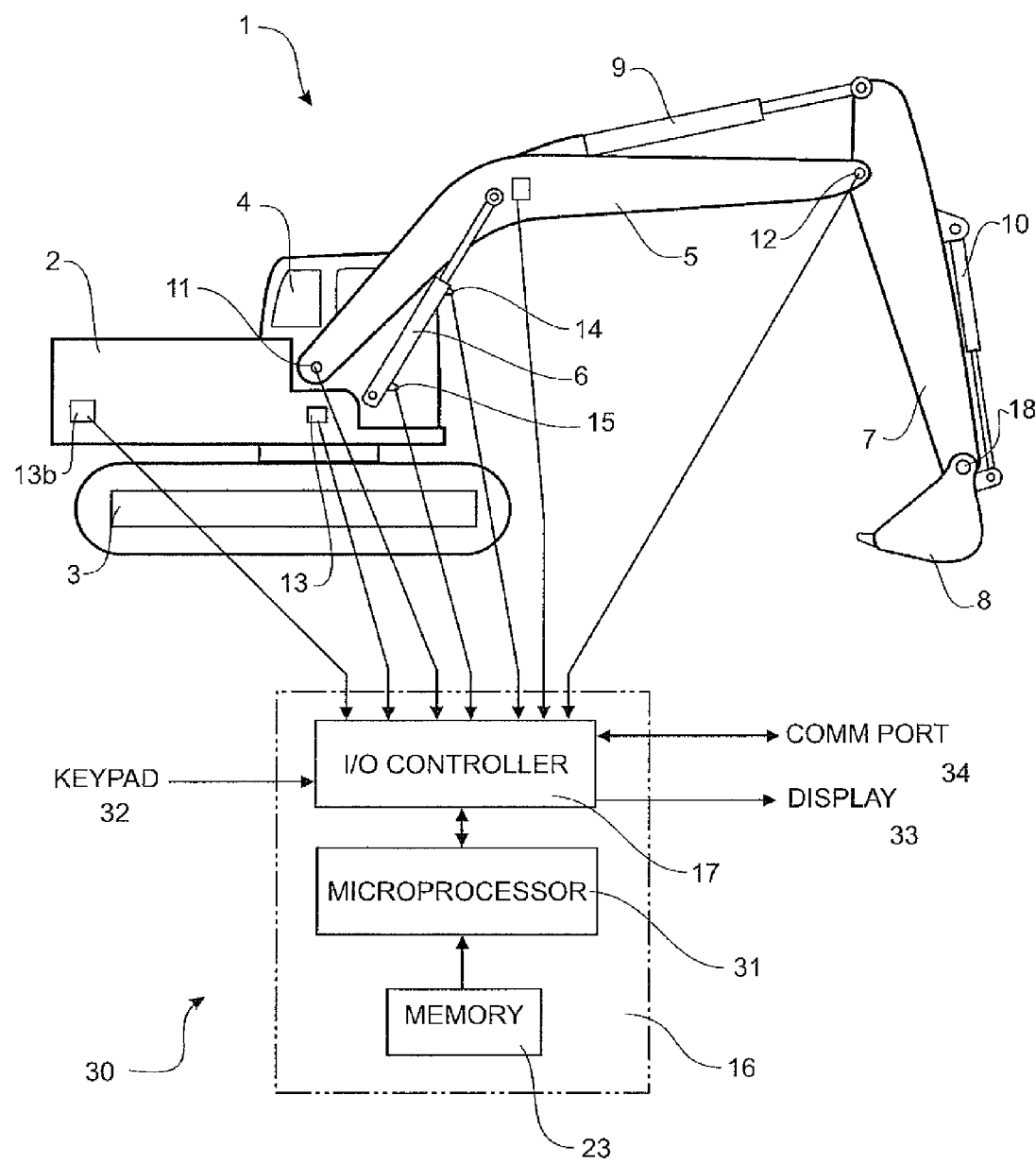
FIG. 1 is a schematic drawing of an excavator and a control unit coupled to the excavator.

FIG. 1 shows an excavator 1 in schematic form. It comprises a chassis 2 on a carriage comprising tracks or other conveying means 3 and a cab 4 for housing the controls of the excavator. An operator can sit in the cab and control the excavator 1. The chassis can slew or rotate relative to the carriage. A boom 5 extends from the chassis 2, the angle of which can be controlled by a hydraulic ram 6 extending between the chassis 2 and the boom 5. A stick 7 is connected to the boom by a pivotable joint and can be arranged at various angles relative to the boom by a hydraulic ram 9. A load holder 8 is provided for scooping or grabbing, holding, transporting and dumping material or other payload. Preferably the load holder is a bucket or grapple. Alternatively, it could be any other type of holding means for holding or retaining a payload, such as an electromagnet. The load holder 8 is connected to the stick 7 by a pivotable joint, and a hydraulic ram 10 enables the angle between the bucket and the stick to be varied as required. An operator can sit in the cab 4 and operate the controls to alter the geometry of the boom 5, stick 7 and load holder 8 in order to manipulate the load holder and its payload in the desired manner. The boom 5 and stick 7 are generically termed as "linkages". The boom 5, stick 7 and holder 8 combination is termed a lifting linkage. It will be appreciated by those skilled in the art that other terms for the linkage elements could be used. For example, the stick can be termed a "fly-boom".

The excavator also has a number of sensors to determine parameters for calculating a weight estimation. These sensors can form part of the existing excavator, or can be retro-fitted to the excavator as part of the first embodiment of the invention.

A first sensor 11 is attached over (or as close as possible to) the pivot point between the boom 5 and chassis 2. The first sensor 11 constantly outputs a pulse width modulated (PWM) signal that corresponds to the angle between the boom and chassis. The same information represented by this signal could be derived in other ways, for example from the extension of the actuator operating between the boom and chassis, or it may be an available output of the control system of the excavator.

A second sensor 12 is attached over (or as close as possible to) the pivot point between the boom and stick. This sensor constantly outputs a PWM signal that corresponds to the relative angle between the boom and the stick. Again, the information represented by this signal could be derived in other ways, for example from the extension of the actuator operating between the boom and stick, or it may be an available output of the control system of the excavator.

A third sensor 18 is attached over (or as close as possible to) the pivot point between the stick and load holder. This sensor constantly outputs a PWM signal that corresponds to the relative angle between the stick and the load holder. Again, the information represented by this signal could be derived in other ways, for example from the extension of the actuator operating between the stick and the load holder, or it may be an available output of the control system of the excavator.

A first tilt sensor 13 is optionally located directly over the centre of rotation of the chassis. The tilt sensor may be, for example, a pendulum sensor. The tilt sensor constantly outputs a PWM signal which corresponds to the inclination angle or tilt of the machine, for example as a result of working on unstable or uneven ground. Other forms of inclinometer or accelerometer could be used as an alternative.

A second tilt sensor 13b (or accelerometer) is located on the machine chassis, some distance from the centre of rotation. The tilt sensor 13b could, for example, be a pendulum sensor. This sensor constantly outputs a PWM signal that corresponds to the inclination angle of the whole machine, and any rotational motion of the chassis. As the chassis rotates the pendulum sensor will experience a centripetal force directly related to the angular speed of rotation. The difference between the outputs of the first and second tilt sensors is directly related to the rotation speed of the chassis—the slew rate. Many other ways of determining the slew rate are also possible. For example the slew rate may be a direct output of the excavator controller, or the sensor could involve a large size rotary encoder.

Two pressure sensors 14, 15 are mounted on the hydraulic actuator that controls the pivoting of the boom relative to the chassis. The sensors are fitted to "tee off" points on both the lift and return pressure lines for the cylinder. The first sensor 15 measures the pressure on the lift side of the actuator. The second sensor 14 measures the pressure on the return side of the actuator.

The pressure sensors are a transducer system which constantly outputs a pair of signals, each directly related to the hydraulic oil pressures on each side of the actuator. These can be used to determine torque. Where the actuator is not a hydraulic actuator other approaches to determining the actuation force would be necessary. For example electrical current measurements may be suitable for an electrical actuator, or the forces could be measured more directly using a strain gauge or load cell.

Figure 2:
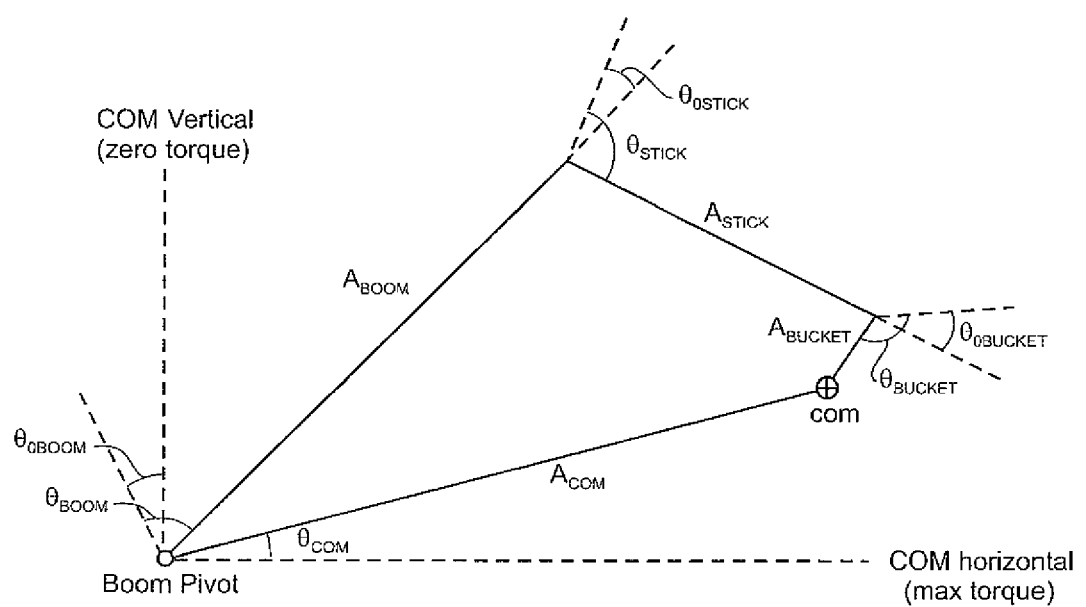
FIG. 2 shows the parameters specifying the geometry of the centre of mass of the excavator.

Referring to FIGS. 1 and 2 the various parameters defining the geometry of the boom, stick and bucket and the position of the centre of mass will be described in further detail. The centre of mass refers to the combined centre of mass of the linkage due to the boom, stick and bucket. The mass and orientation/position of each linkage element contributes to the combined centre of mass. From this point on, the specification will refer to the load holder being a bucket, but it will be appreciated that this is not the only type of load holder that could be used.

Referring to FIG. 2:

Angle $\theta_{boom}$, is the angle between a first datum line and vector $A_{boom}$, where $A_{boom}$ is the vector of the component of the centre of mass provided by the boom. $\theta_{boom}$ is determined/measured from the boom angle sensor 11.

Angle $\theta_{0boom}$ is the arbitrary angle between the datum line and a line extending vertically from the chassis at the pivot between the boom and the chassis.

Angle $\theta_{stick}$ is the angle between a second datum line and vector $A_{stick}$, where $A_{stick}$ is the vector of the component of the centre of mass provided by the stick. $\theta_{stick}$ is determined/measured from the boom angle sensor 12.

Angle $\theta_{0stick}$ is the angle between the second datum line and a line continuing from the vector $A_{boom}$.

Angle $\theta_{bucket}$ is the angle between a third datum line and vector $A_{bucket}$, where $A_{bucket}$ is the vector of the component of the centre of mass provided by the bucket. $\theta_{bucket}$ is determined/measured from the boom angle sensor 18, or otherwise determined.

Angle $\theta_{0bucket}$ is the angle between the third datum line and a line continuing from the vector $A_{stick}$.

$A_{boom}$ is the amplitude of the torque on the boom, $A_{stick}$ is the torque on the stick, and $A_{bucket}$ is the torque on the bucket.

$\theta_{com}$ is the angle between the horizontal line extending through the chassis of the excavator and the line extending from the pivot of the boom and the chassis to the centre of mass of the boom, stick and bucket. $A_{com}$ is the torque at the centre of mass.

FIG. 1 also shows diagrammatically a block diagram of a control unit 16 for calculating an estimated payload weight in the bucket of an excavator such as that shown in FIG. 1. The control unit 16 can be retrofitted to an excavator 1. The apparatus 16 comprises a microprocessor and controller 31 that carries out the calibration and weight estimation calculations of the preferred embodiment, which is set out in further detail in FIGS. 3 and 4. The controller is programmed or configured in a suitable manner to achieve this. The processor/controller 31 also comprises inputs for coupling to an I/O controller 17, which itself has inputs to couple to the boom angle sensor 11, the stick angle sensor 12, the bucket angle sensor 1S, and pressure sensors 14, 15 (from which torque can be determined). As mentioned previously, the boom, stick and bucket angle sensors 11, 12, 18 are existing on the excavator, or can form part of the present embodiment and supplied for use with the control unit. In this case, the sensors can be retro fitted to the excavator. Alternative to pressure sensors for determining torque, a torque sensor is arranged on or near the boom ram 6 and is adapted to sense the torque applied to the boom. In this way, the control unit 16 via the sensors can measure or otherwise determine a torque parameter, being torque or a parameter indicative of torque (such as pressure). Where a parameter indicative of torque is determined, torque can be calculated from that parameter by the microprocessor. The apparatus 30 also comprises an output connected to the processor/controller 31 which is adapted to display an indication of the estimated weight at any particular time.

The I/O controller 17 samples each of the sensor signals sequentially. A program running in the microprocessor/controller 31 applies an algorithm to calculate a weight estimation. The input interface also receives input from a user keypad 32. The controller 31 outputs feedback to a screen 33 for the operator, and may also output data through a data communications interface or comm-port 34. The comm-port may allow for remote transmission, either one way or two way—for example using a radio modem, RS232 or USB.

The program running on the microcontroller is operable in at least two modes. In a setup and calibration mode the program prompts the operator through at least one of a series of activities. The program monitors the sensor readings during these activities and calculates data values that represent the particular performance of the machine to which the device is fitted. These calibration data values are then saved into the microcontrollers onboard memory 23. The calibration process is described in more detail below for each of the factors that are used by the program in the main load estimation function. In an operating mode the program monitors the sensor readings to discern load lift parameters.

It will be appreciated while in the preferred embodiment the payload weight estimation apparatus comprises all the features shown in FIG. 1, it is possible that the device may just comprise a processor/controller, or some other combination of the features shown. The remaining features in this case may already be integrally formed, or previously installed on the excavator. The processor/controller could therefore be used to or adapted to take advantage of existing components already in existence on the excavator.

Figure 3:
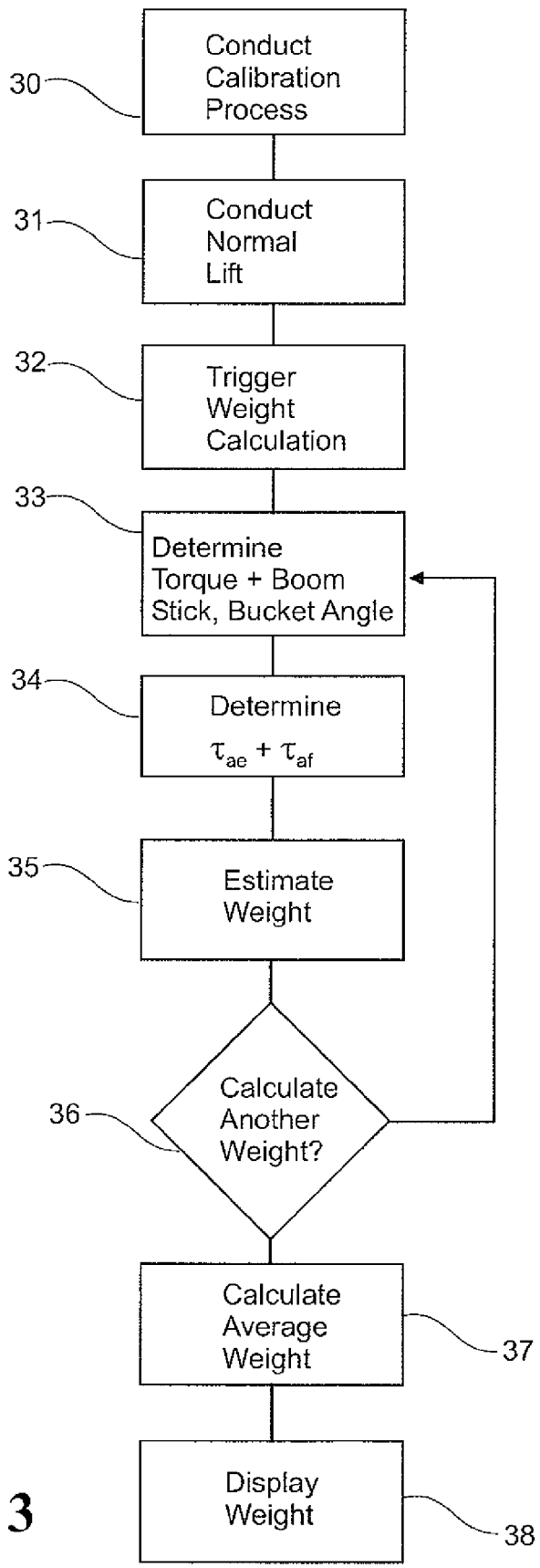
FIG. 3 is a flow chart showing the calibration process and weight estimation calculation process carried out by the excavator and control unit.

FIG. 3 is a flow chart showing a general overview of the calibration and payload weight estimation method in accordance with the preferred embodiment of the invention. At least part of this method is carried out by the payload weight estimation apparatus. Parts of the method also comprise various operations of the excavator. Before carrying out the method, the payload weight estimation apparatus 30 is installed on the excavator 1. Then, step 30, a calibration process is undertaken. This comprises the operator carrying out a series of calibration lifts by operating the linkages and taking various readings of the torque and the hydraulic ram 6 and the boom, stick and bucket angles. The term "lift" (both during calibration and normal usage) can apply generically to any manipulation of the boom, stick and bucket by an operator. For example, a typical lift will be where the bucket is operated to scoop some material and then the boom and stick are operated to move the bucket to a desired dumping point. The bucket is then manoeuvred to dump the material in the desired spot. Clearly, myriad other types of lifts could be performed, by manipulating the boom, stick and bucket in a desired manner. Calibration lifts are carried out with a full payload in the load holder, and then again for no payload in the load holder. After the calibration lifts are completed, processing is then carried out to determine calibration torque profiles for an empty and full bucket.

Once calibration has actually taken place, then the excavator can be operated in the normal manner to execute lifts, step 31, and the apparatus is adapted to, at various times, calculate an estimation of weight of a payload in the bucket, steps 31 to 38. This weight estimation can take place continually or it could be triggered by one or a combination of events. For example, it could be triggered, step 32, by an operator indicating that weight estimation should take place, or by the linkages being configured into a particular geometry. Other trigger mechanisms are possible. Usually, weight calculation will be triggered during an actual event or linkage configuration during a lift.

Once the weight calculation process has been triggered, step 32, the torque, or a parameter indicative of torque, between the boom 6 and chassis 2 is determined, step 33. This is done by measuring the pressure in the hydraulic ram 6 via a suitable pressure sensor 14 or 15 or similar. The boom, stick and bucket angles are also determined, step 33.

Next, step 34, dynamic torque adjustment parameters for a full and empty bucket are calculated in order to compensate for accelerations that occur during the lift. If the lift does not happen perfectly smoothly, which will not occur in a real lift, compensations are made to compensate for various torques that occur due to dynamic forces occurring during the lift. A payload weight estimate is then calculated, step 35, using the determined torque, or parameter indicative of torque, the measured boom, stick and bucket angles, the appropriate torques from the calibrated torque profiles and the dynamic torque adjustment parameters. This estimated weight could then be output to a user, step 38. However, preferably, several payload weight estimations, step 35, are calculated over the course of the lift for more accuracy. In this case, the steps 33-36 are repeated several times throughout the lift, in accordance with starting and stopping trigger points or linkage geometries. An average of all the estimated weights is then calculated, step 37 and the weight is displayed, step 38 on the output device 33 and/or 34.

The process will now be described in more detail with reference to FIGS. 4 to 13. In order to calculate a weight estimation during a lift, the following mathematical relationship is used.

$$M = \frac{(\tau - (\tau_e + \tau_{ae}))M_c}{(\tau_f + \tau_{af}) - (\tau_e + \tau_{ae})} \quad (1)$$

where

M=mass of load
$\tau$=measured torque (from pressure sensors)
$\tau_e$=curve fitted torque for empty bucket
$\tau_{ae}$=extra torque from acceleration of empty bucket
$\tau_f$=curve fitted torque for full bucket (test weight)
$\tau_{af}$=extra torque from acceleration of full bucket
$M_c$=mass of calibrated test weight. This is the "full" bucket mass.

$\tau_e$ and $\tau_f$ are determined from profiles that are generated from a calibration process. $\tau_{ae}$ and $\tau_{af}$ are dynamically determined during an actual lift and will be described later. $M_c$ is the calibrated mass that is used during the lift calibration process.

Calibration Method

Figure 4:
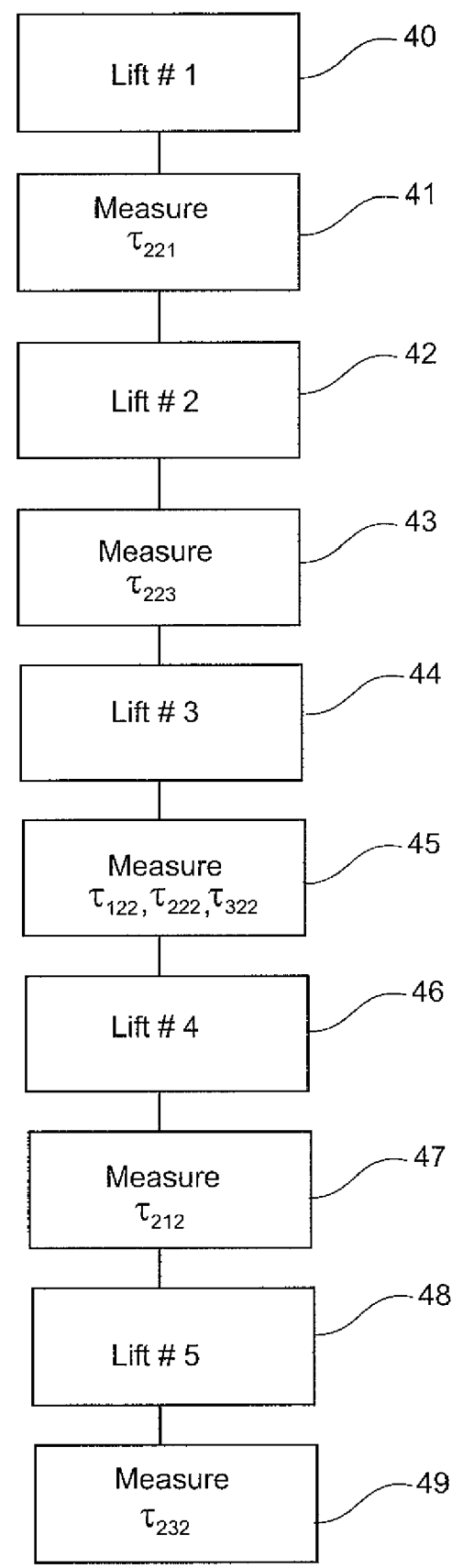
FIG. 4 is a flow diagram of the calibration process in further detail.
Figure 5:
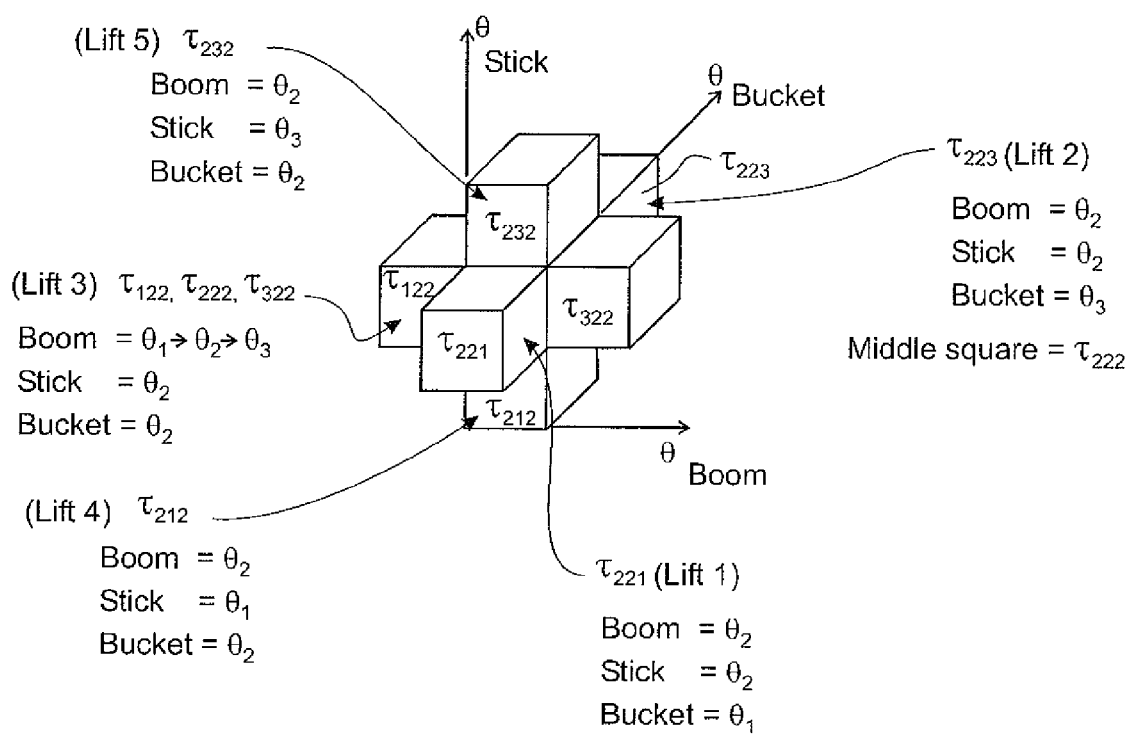
FIG. 5 is a block diagram showing the parameters obtained in the calibration lifts.

FIG. 4 is a flow chart showing a calibration process shown in step 30 of FIG. 3 in more detail. FIG. 5 shows diagrammatically the various parameters determined throughout the 5 calibration lifts. FIGS. 6a-6e show linkage configuration for each of the 5 calibration lifts. The calibration process can be carried out at any suitable time, for example, when installing the control unit. This could occur well before any use of the excavator and weight estimation system takes place. The calibration process involves a two sets of five calibration lifts. One set of five lifts is carried out with a payload held by the load holder, and the other set without any payload.

Figure 6A:
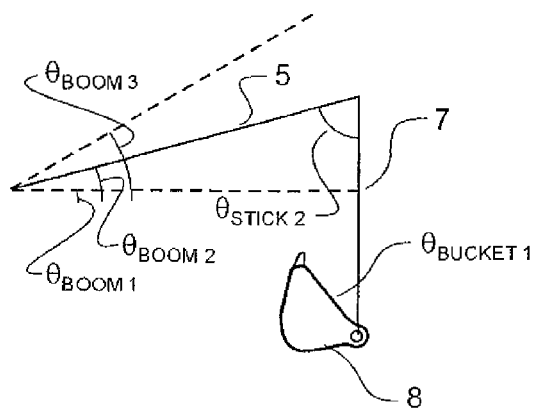
FIGS. 6a-6e show geometries of the excavator linkage during the calibration lifts.

In calibration lift 1, step 40, the stick is put in a substantially vertical orientation (angle $\theta_{stick2}$) in the middle or vertical position of its travel and the bucket 8 is placed in the fully retracted or up position (angle $\theta_{bucket1}$) as shown in FIG. 6a. The operator then moves the boom through three angles $\theta_{boom1}$, $\theta_{boom2}$, $\theta_{boom3}$. These angles could relate to any angles through which the boom can move. Preferably, $\theta_{boom1}$ and $\theta_{boom3}$ are within a suitable travel angle of the boom to prevent the boom "crashing" at the end of its travel, thus affecting measurements during the calibration process. A torque parameter, being torque or a parameter indicative of torque between the boom and the chassis is then determined for angle $\theta_{boom2}$. This is done by measuring the pressure in the hydraulic ram 6 via the pressure sensors 14, 15, or by using some other suitable method, step 41. Referring to FIG. 5, this obtains a torque parameter $\tau_{221}$ for the parameter $\theta_{boom2}$ for a stick angle $\theta_{stick2}$ and bucket angle $\theta_{bucket1}$.

Figure 6B:
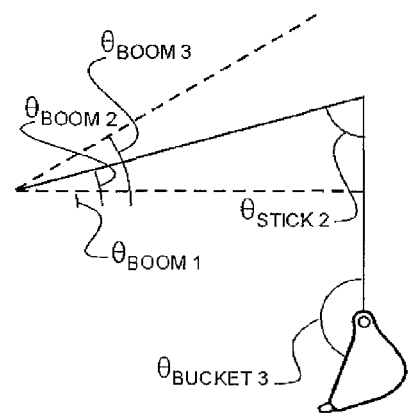
Figure 6C:
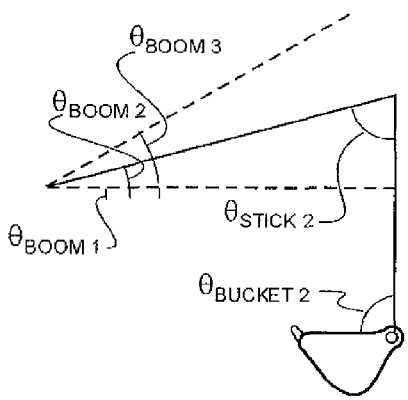

In calibration lift 2, step 42, the stick 7 remains in the middle or vertical orientation, while the bucket 8 is placed in a second position (angle $\theta_{bucket3}$). The configuration of the stick 7 and bucket 8 is shown in FIG. 6b. Again, the boom is moved through angles $\theta_{boom1}$, $\theta_{boom2}$, and $\theta_{boom3}$, step 42. A torque parameter, being torque or a parameter indicative of torque between the boom and the chassis is then determined, step 43, for angle $\theta_{boom2}$. Referring to FIG. 5, this obtains a torque parameter $\tau_{223}$ for the parameter $\theta_{boom2}$ for a stick angle $\theta_{stick2}$ and bucket angle $\theta_{bucket3}$.

In calibration lift 3, step 44, the stick is put in a substantially vertical orientation (angle $\theta_{stick2}$) in the middle of its travel and the bucket 8 is put is in its middle position (angle $\theta_{bucket2}$). This configuration is shown diagrammatically in FIG. 6c. Again the boom is moved through three angles $\theta_{boom1}$, $\theta_{boom2}$, and $\theta_{boom3}$ and a torque or parameter indicative of torque is determined, step 45, for each angle $\theta_{boom1}$, $\theta_{boom2}$ and $\theta_{boom3}$. Referring to FIG. 5, this obtains three torque parameters $\tau_{122}$, $\tau_{222}$, and $\tau_{322}$ for the parameters $\theta_{boom1}$, $\theta_{boom2}$, $\theta_{boom3}$ respectively, for a stick angle $\theta_{stick2}$ and bucket angle $\theta_{bucket2}$.

Figure 6D:
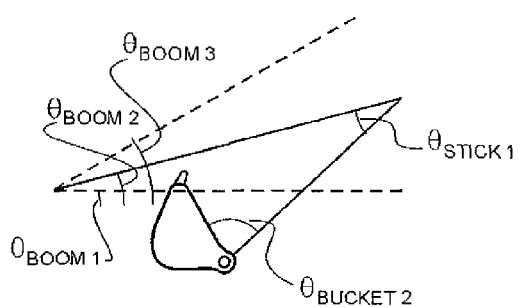

In calibration lift 4, step 46, the stick is manoeuvred into its retracted position (angle $\theta_{stick1}$) and the bucket is kept in the middle position as shown in FIG. 6d. The boom is moved through three angles $\theta_{boom1}$, $\theta_{boom2}$, and $\theta_{boom3}$ and a torque or parameter indicative of torque is determined, step 47, for angle $\theta_{boom2}$. Referring to FIG. 5, this obtains a torque parameter $\tau_{212}$ for the parameter $\iota_{boom2}$ for a stick angle $\theta_{stick1}$ and bucket angle $\theta_{bucket2}$.

Figure 6E:
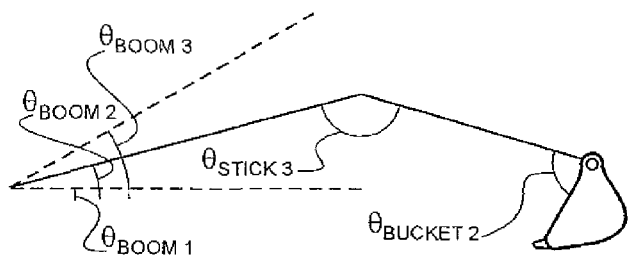

In calibration lift 5, step 48, the stick 7 is moved into its outer most position (angle $\theta_{stick3}$) and the bucket is kept in the middle position as shown in FIG. 6e. The boom is moved through three angles $\theta_{boom1}$, $\theta_{boom2}$, and $\theta_{boom3}$ and a torque or parameter indicative of torque is determined, step 49, for angle $\theta_{boom2}$. Referring to FIG. 5, this obtains a torque parameter $\tau_{232}$ for the parameter $\theta_{boom2}$ for a stick angle $\theta_{stick3}$ and bucket angle $\theta_{bucket2}$.

Determination of Torque Profiles

The calibration lifts one to five, steps 40-49 and associated parameter determination are carried out twice. During one set of lifts a calibrated mass is held by the load holder, and in the other set of five calibrated lifts there is no mass held by the load holder. The parameters determined during the calibration lifts, steps 40-49 are utilised to determine torque profiles. A first torque profile is determined for an empty bucket (or more generally a first payload), and a second torque profiled is determined for a bucket with a payload (which has a greater mass than the previous payload). These profiles in turn are utilised to determine $\tau_e$ and $\tau_f$ set out in equation 1. Each determined torque profile (for empty and full bucket) takes the following form:

$$\tau = A_{bucket} \sin(\theta_{bucket} - \theta_{0bucket} + \Delta\theta_{stick} + \Delta\theta_{boom}) + A_{stick} \sin(\theta_{stick} - \theta_{0stick} + \Delta\theta_{boom}) + A_{boom} \sin(\theta_{boom} - \theta_{0boom}) + B_{boom} \quad (2)$$

The torque profiles for an empty and full bucket are separately determined using the above general equation 2 and by using the determined torque parameters from the corresponding calibration lifts.

Figure 7:
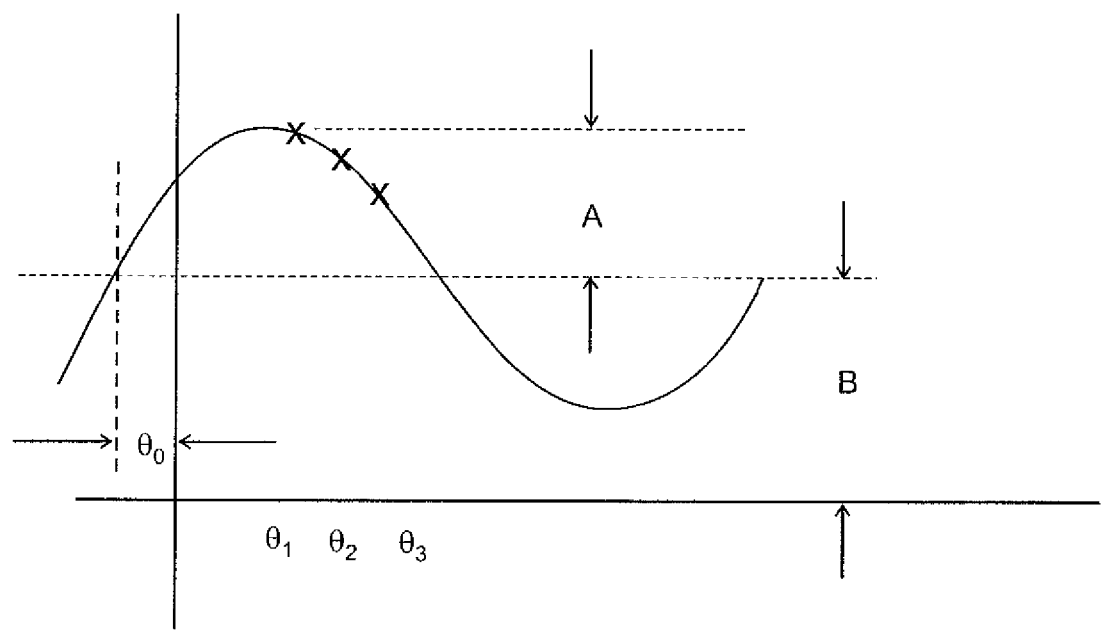
FIG. 7 is a sine wave curve fitted to three data points.

Equation 2 is derived in the following manner. A series of sine waves of the form y=A sin (θ−θ₀)+B are curved fitted to the torque parameters measured during a respective set of calibration lifts. A generic example of a sine wave curve fitted to three values is shown in FIG. 7. Here, A is the amplitude, B is the amplitude offset from zero and $\theta_0$ is the angular offset of the curve profile as shown in FIG. 7. The parameters A, B and $\theta_0$ can be determined using the following equations:

$$\theta_0 = \tan^{-1}\left[\frac{(\tau_3-\tau_2)(\sin\theta_1-\sin\theta_2)-}{(\tau_1-\tau_2)(\sin\theta_3-\sin\theta_2)}\frac{(\tau_1-\tau_2)(\cos\theta_2-\cos\theta_3)-}{(\tau_3-\tau_2)(\cos\theta_2-\cos\theta_1)}\right], \quad (3)$$

$$A = \frac{\tau_3-\tau_1}{\sin(\theta_3-\theta_0)-\sin(\theta_1-\theta_0)}, \quad (4)$$

$$B = \tau_2 - A\sin(\theta_2-\theta_0) \quad (5)$$

Using the above we can derive the equation 1.

Figure 8:
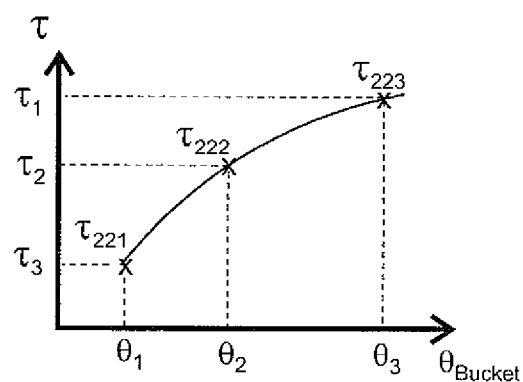
FIG. 8 is a graph showing part of a sine wave curved fitted to three torque parameters for three bucket angles.

Referring to FIG. 8, first a sine wave is curve fitted to the torques, $\tau_{221}$, $\tau_{222}$ and $\tau_{223}$ measured for corresponding bucket angles $\theta_{bucket1}$, $\theta_{bucket2}$ and $\theta_{bucket3}$. These torques correspond to the three bucket angles in calibration lifts 1, 2 and 3. This curve fitting gives the following equation:

$$\tau = A_{bucket}\sin(\theta_{bucket}-\theta_{0bucket})+B_{bucket} \quad (6)$$

where $A_{bucket}$ is the magnitude of the torque around the boom pivot point due to the bucket. $B_{bucket}$ is the torque around the boom pivot point due to the remainder of the linkage, that is the boom and the stick. This is effectively a torque offset when looking at the bucket torque profile that is curved fitted to a sine wave. $B_{bucket}$ is a function of the boom and stick geometries, and is to be determined. In effect, $B_{bucket}$ is the sum of the torque around the boom pivot due to the boom, and the torque around the boom pivot due to the stick.

Assuming $\theta_{boom}$ is constant, $B_{bucket}$ can be defined by:

$$B_{bucket} = A_{stick}\sin(\theta_{stick}-\theta_{0stick})+B_{stick} \quad (7)$$

where $A_{stick}$ is the magnitude of the torque around the boom pivot point due to the stick. $B_{stick}$ is the torque around the boom pivot point due to the remainder of the linkage, that is the boom. This is effectively a torque offset when looking at the bucket torque profile that is curved fitted to a sine wave. $B_{stick}$ is a function of the boom geometry. In effect, $B_{stick}$ is the sum of the torque around the boom pivot due to the boom.

Figure 9:
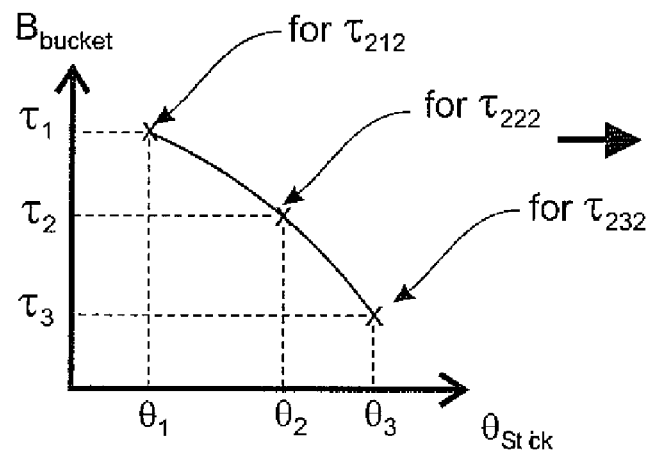
FIG. 9 is a graph showing part of a sine wave curve fitted to three torque parameters for three stick angles.

Referring to FIG. 9, $B_{bucket}$ is the torque $\tau_{212}$, $\tau_{222}$ and $\tau_{232}$ respectively measured for respective stick angles $\theta_{stick1}$, $\theta_{stick2}$ and $\theta_{stick3}$ when the angle of the bucket is constant at $\theta_{bucket2}$ and the angle of the boom is constant at $\theta_{boom2}$. $B_{stick}$ values for a changing $\theta_{stick}$ can be found, assuming $\theta_{boom}$ and $\theta_{bucket}$ kept constant, and assuming, $$\theta'_{0bucket} = \theta_{0bucket}+\Delta\theta_{stick}. \quad (8)$$

where $\theta'_{0bucket}$ is the angle offset of the bucket adjusted to take into account the angle of the stick.

Substituting these parameters into equation 5 gives:

$$B = \tau_2 - A_{bucket}\sin(\theta_2-\theta_{0bucket}+\Delta\theta_{stick}) \quad (9)$$

Using equation 9 twice with points $\tau_{212}$ ($\theta_{stick1}$) and $\tau_{232}$ ($\theta_{stick3}$) the $B_{stick}$ values with changing $\theta_{stick}$ can be found. Similarly, assuming $\theta_{stick}$ is constant, $B_{bucket}$ can be defined by:

$$B_{bucket} = A_{boom}\sin(\theta_{boom}-\theta_{0boom})+B_{boom} \quad (10)$$

where $A_{boom}$ is the magnitude of the torque around the boom pivot point due to the boom. $B_{boom}$ is the torque around the boom pivot point due to any offset.

Figure 10:
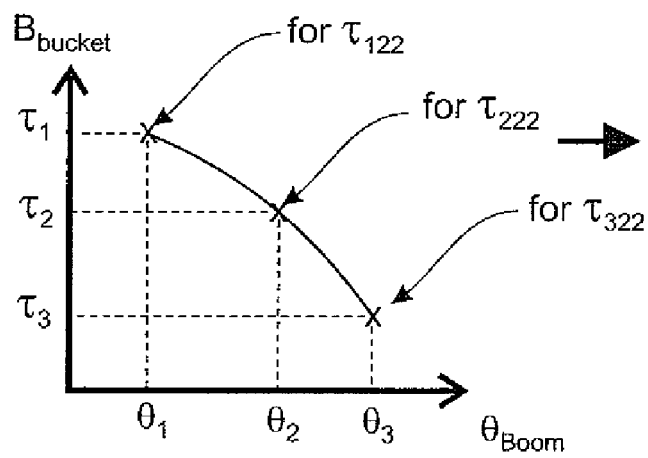
FIG. 10 is a graph showing part of a sine wave curve fitted to three torque parameters for three boom angles.

Referring to FIG. 10, in this case, $B_{bucket}$ is the torque $\tau_{122}$, $\tau_{222}$ and $\tau_{322}$ respectively measured for respective boom angles $\theta_{boom1}$, $\theta_{boom2}$ and $\theta_{boom3}$ when the angle of the bucket is constant at $\theta_{bucket2}$ and the angle of the stick is constant at $\theta_{stick2}$ Next, in a similar manner, the $B_{boom}$ values for a changing $\theta_{boom}$ can be found, with $\theta_{stick}$ kept constant. In this case, it is again assumed that $A_{bucket}$ is constant and that $$\theta'_{0bucket} = \theta_{0bucket}+\Delta\theta_{boom}. \quad (11)$$

where $\theta'_{0bucket}$ is the angle offset of the bucket adjusted to take into account the angle of the boom.

Substituting these parameters into equation 5 gives:

$$B = \tau_2 - A_{bucket}\sin(\theta_2-\theta_{0bucket}+\Delta\theta_{boom}) \quad (12)$$

Figure 11:
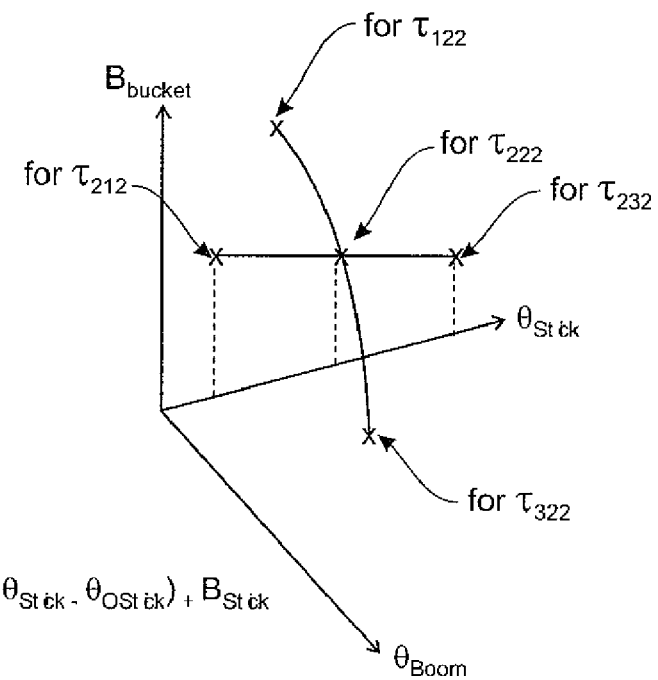
FIG. 11 is a graph showing the superposition of FIGS. 9 and 10.

This is used to calculate $B_{boom}$ values, where $(\theta_2,\tau_2)=(\theta_{boom1},\tau_{122})$ and $(\theta_3,\tau_3)=(\theta_{boom3},\tau_{322})$ Now, we have another two points on our B "surface" as can be seen in FIG. 11. Now this surface is curve fitted to find an equation for $B_{bucket}$. That is, first a curve is fitted to $\theta_{stick}$ 'B' curve ② (with B values of $\tau_{212}$, $\tau_{222}$, $\tau_{232}$) using equation 7:

$$B_{bucket} = A_{stick}\sin(\theta_{stick}-\theta_{0stick})+B_{stick} \quad (7)$$

Now, assume that $A_{stick}$ is constant and that:

$$\theta'_{0stick} = \theta_{0stick}+\Delta\theta_{boom} \quad (13)$$

where $\theta'_{0stick}$ is the angle offset of the stick adjusted to take into account the angle of the boom.

$B_{stick}$ values for all boom positions are found using the equation:

$$B = \tau_2 - A_{stick}\sin(\theta_2-(\theta_{0stick}+\Delta\theta_{boom})) \quad (14)$$

where $(\theta_2,\tau_2)=(\theta_{boom1},\tau_{122})$ and $(\theta_3,\tau_3)=(\theta_{boom3},\tau_{322})$.

Figure 12:
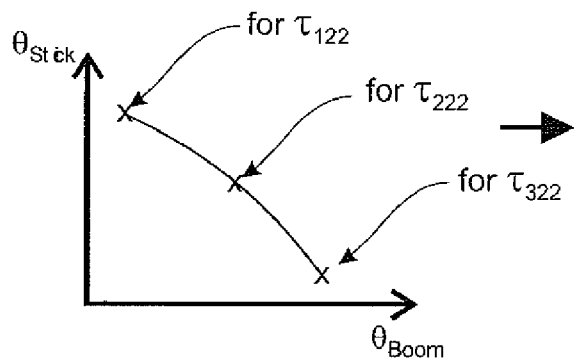
FIG. 12 shows a graph of a sine wave curve fitted to three torque values for a constant stick angle.

Referring to FIG. 12, curve fit this B curve to find:

$$B_{stick} = A_{boom}\sin(\theta_{boom}-\theta_{0boom})+B_{boom} \quad (15)$$

Then substituting equation 15 into equation 7, and using equation 13 we get:

$$B_{bucket} = A_{stick}\sin(\theta_{stick}-\theta_{0stick}+\Delta\theta_{boom})+A_{boom}\sin(\theta_{boom}-\theta_{0boom})+B_{boom} \quad (16)$$

Then substituting equation 16 into equation 6 we get equation 2, namely:

$$\tau = A_{bucket}\sin(\theta_{bucket}-\theta_{0bucket}+\Delta\theta_{stick}+\Delta\theta_{boom})+A_{stick}\sin(\theta_{stick}-\theta_{0stick}+\Delta\theta_{boom})+A_{boom}\sin(\theta_{boom}-\theta_{0boom})+B_{boom} \quad (2)$$

where $\theta_{0bucket}$, $\theta_{0stick}$, $\theta_{0boom}$ are calculated from equation 3, τ is the torque as a function of $\theta_{bucket}$, $\theta_{stick}$, $\theta_{boom}$, $\Delta\theta_{stick}$ is $\theta_{stick2}-\theta_{stick}$, $\Delta\theta_{boom}$ is $\theta_{boom2}-\theta_{boom}$, $A_{boom}$, $A_{stick}$, $A_{bucket}$ are calculated from respective equations 10, 7 and 6, and equations 3, 4, 5 from parameters measured during calibration lifts.

As noted above, equation 2 can be used to determine payload and no payload torque profiles for use in equation 1. The torque profiles are determined before an actual lift takes place. They are stored in memory for when they are needed during a weight estimation calculation process during a lift. The torque is calculated using equation 2 and the parameters determined or measured from the calibration lifts.

Determination of Dynamic Torque Adjustments

In the ideal case where lift movement is steady, the torque profiles above could be used to calculate a sufficiently accurate weight estimate during an actual lift. However, in practice, linkage movement is not steady, and this creates accelerations in the centre of mass of the linkage. To calculate an accurate estimate using the profiles above, dynamic torques generated by the acceleration of the centre of mass due to "jerky" movement need to be determined, which can then be used to compensate for the acceleration of the centre of mass. These compensations are $\tau_{ae}$ and $\tau_{af}$ which occur in equation 1. These compensations are not calculated during the calibration lift, but are calculated as required when an actual lift is being conducted.

To find the dynamic torque when the bucket is empty, the linear acceleration of the centre of mass is multiplied by the distance to the centre of mass. This dynamic torque is a function of the weight of the total mass of the boom, stick, and bucket without material ($M_0$), the distance to the centre of mass, and the linear acceleration of the centre of mass.

The dynamic torque when the bucket is full is calculated in the same manner, except the total weight $M_0$, has the weight of the calibrated mass ($M_C$) added to it.

More specifically, $\tau_{ae}$ and $\tau_{af}$ and calculated in the following manner. First, $A_{com}$ and $\theta_{com}$ are determined. These represent the amplitude of torque at the centre of mass and the angle between the horizontal and the centre of mass respectively. First the values for $A_{bucket}, \theta_{0bucket}, A_{stick}, \theta_{0stick}, A_{boom}$ and $\theta_{0boom}$ are used to find $A_{com}$ and $\theta_{com}$.

Figure 13:
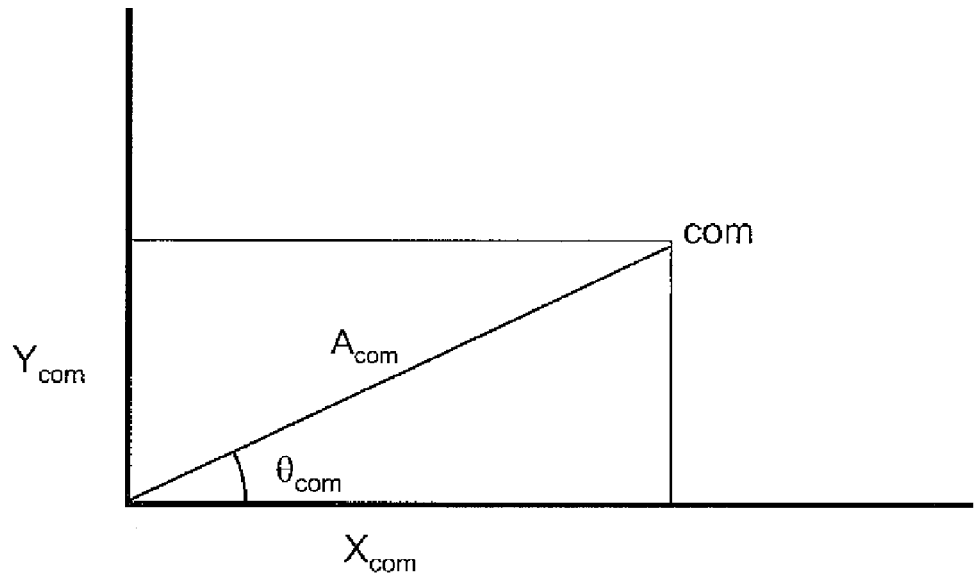
FIG. 13 shows the geometry of the centre of mass of the linkage.

Referring to FIGS. 2 and 13, $$A_{com} = \frac{x_{com}}{\cos \theta_{com}} \quad (17)$$

$$\theta_{com} = \tan^{-1}\left(\frac{y_{com}}{x_{com}}\right) \quad (18)$$

Where $X_{com}$ is calibrated static torque curves and $A_{com}$ is the amplitude of the torque of the centre of mass of the linkage including any load, and $\theta_{com}$ is the angle of the centre of mass with respect to the horizontal.

It is known that torque is defined by:

$$\tau_a = F_a D \quad (19)$$

where $$F_a = ma \quad (20)$$

So, for an empty bucket, $$\tau_{ae} = M_o a_e D_e \quad (22)$$

where
$M_o$=total mass of Boom, Stick and Bucket
$a_e$=the acceleration of the centre of mass (empty bucket), and
$D_e$=the distance to the centre of mass (empty bucket).

Where $A_{come}$ is amplitude of the torque due to the centre of mass of an empty bucket $$A_{come} = M_o g D_e \Rightarrow D_e = \frac{A_{come}}{M_o g}, \quad (23)$$

where $$a_e = \Delta V_e \quad (24)$$

Where
g is gravity, and
$V_e$ is velocity of an empty bucket.

Therefore, $$V_e = \Delta \theta_{come} D_e \quad (25)$$

and by substitution of equation 24 into equation 25

$$V_e = \frac{\Delta \theta_{come} A_{come}}{M_o g} \quad (26)$$

This obtains a dynamic torque adjustment for an empty bucket of:

$$\tau_{ae} = \Delta V_e A_{come} \quad (27)$$

Similarly for a full bucket, $$\tau_{af} = (M_o + M_c) a_f D_f \quad (28)$$

Where $M_c$ is the calibration weight $$V_f = \frac{\Delta \theta_{comf} A_{comf}}{(M_o + M_c) g} \quad (29)$$

And this gives a dynamic torque adjustment for a full bucket of $$\tau_{af} = \Delta V_f A_{comf} \quad (30)$$

Figure 14:
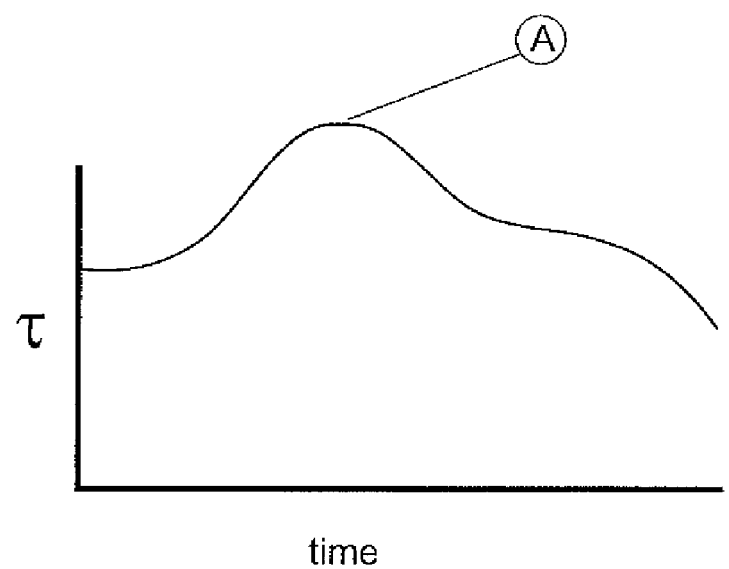
FIG. 14 is a graph of torque vs. time for determining the mass of the linkage.

Referring now to FIG. 14, which shows an example torque vs. time profile during a lift, $M_o$ is worked out during the calibration process. During a calibration lift, there is a peak torque A that is due to the extra acceleration required to get the linkage moving. This is due to the mass of the linkage. From this peak torque, a peak acceleration, and therefore linkage mass can be determined.

Once all the above parameters have been calculated, equation 1 (reproduced below) can then be utilised to calculate a weight estimation, as shown in step 35 in FIG. 3.

$$M = \frac{(\tau - (\tau_e + \tau_{ae})) M_c}{(\tau_f + \tau_{af}) - (\tau_e + \tau_{ae})} \quad (1)$$

where
M=mass of load
$\tau$=calculated Torque (from passive translators)
$\tau_e$=curve fitted Torque for Empty Bucket
$\tau_{ae}$=extra Torque from acceleration of Empty Bucket
$\tau_f$=curve fitted Torque for Full Bucket (test weight)
$\tau_{af}$=extra Torque from acceleration of Full Bucket
$M_c$=mass of calibrated test weight That is, the weight estimation process is triggered during a lift, and the current torque $\tau$ (from the pressure sensors on the hydraulic ram) is determined along with the angles of the boom, stick and bucket. The empty bucket torque profile (which is determined in the calibration process from equation 2) as described above is utilised to find a torque estimation $\tau_e$ of an empty bucket for the boom, stick and bucket angle. Similarly, the full bucket torque profile (which is determined in the calibration process from equation 2) as described above is utilised to find a torque estimation $\tau_f$ of a full bucket for the boom, stick and bucket angle, using calibrated mass $M_c$. Then the dynamic torques $\tau_{ae}$ and $\tau_{af}$ to compensate for acceleration in the centre of mass. The microprocessor 31 uses these parameters to calculate a weight estimation using equation 1. Where several weight estimations are calculated and averaged, this process is reiterated the required number of times. The final weight estimation is then output to the cab operator via an LCD screen 33 or other suitable output device.

In effect, the weight estimation calculation above finds where the current 'active' torque reading lies in proportion to 1 and 2 (below) and multiplies this proportion by the calibrated mass to find the actual weight of the load.
1. The known static torque at any point for an empty and a full bucket.
2. The known dynamic torque due to the acceleration of the COM for an empty and a full bucket.

The weight estimation calculation can be triggered to take place in one of several ways. In one option, the weight estimation calculation process commences when the boom moves through a particular angle. For example, it might trigger when the boom moves past 45 degrees to the horizontal, as measured by the angle sensor. The drawback of this approach is that this might trigger weight at a point where the operator of the excavator cannot see the bucket, and therefore cannot be sure that the bucket has the correct payload.

In another option, the weight estimation is triggered when the bucket (or other load holder) itself reaches a certain point, being a region that is visible to the operator. This region can be defined, and the linkage geometries that result in the load holder entering this regions determined. Then, when the linkage reaches such a geometry, the estimation process is triggered.

Figure 16A:
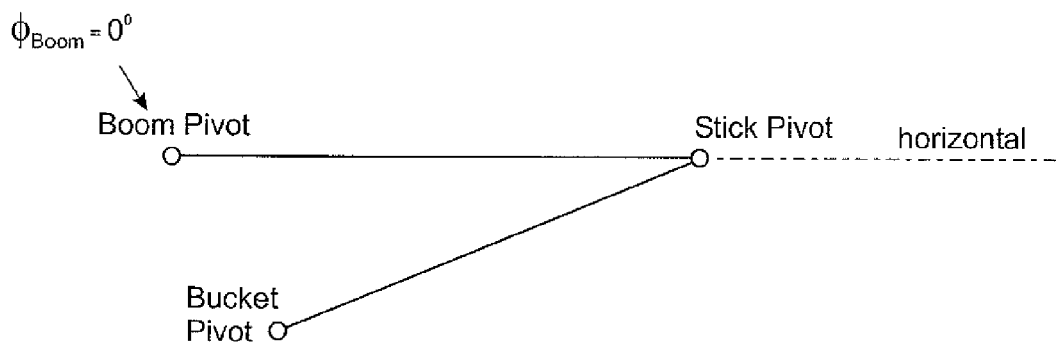
FIGS. 16a-16c show linkage geometries for determining a weight estimation trigger region.
Figure 16B:
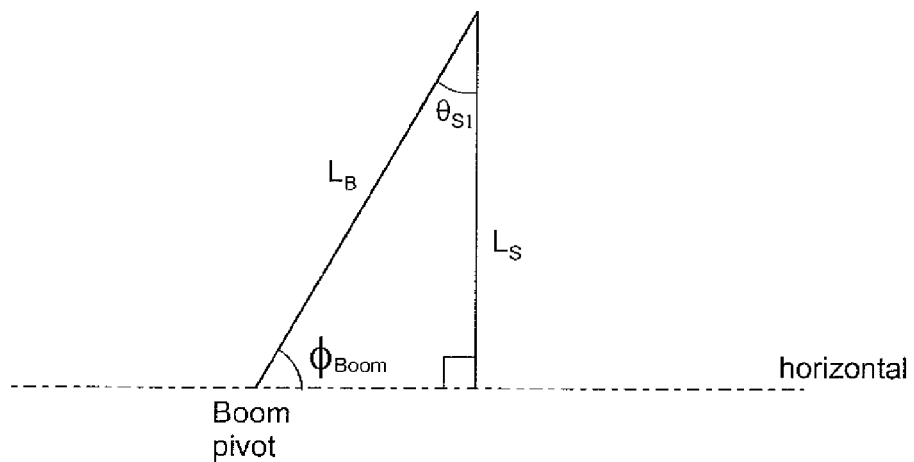

More particularly, referring to FIG. 16a, first absolute angles of the boom and stick are found. This is done by first placing the stick in line with the boom pivot, as shown. Next, the bucket pivot is placed at 90 degrees to horizontal, with respect to the stick pivot, as shown in FIG. 16b. This gives:

$L_s = L_B \sin \phi_{boom}$ and $\theta_{s1} = 90 - \phi_{boom}$

Figure 16C:
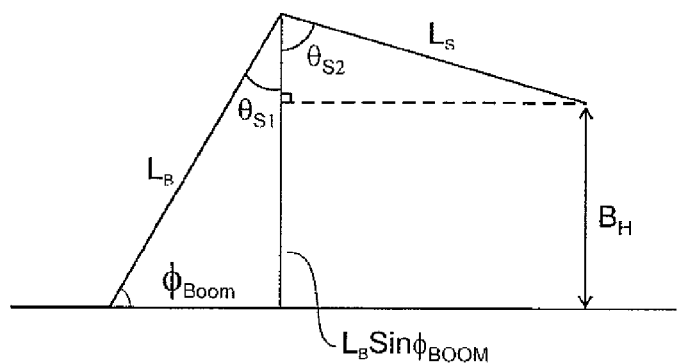

Next, the bucket height ($B_H$) is determined, referring to FIG. 16c, where:

$\theta_{s2}$ = stick angle $- \theta_{s1}$ so, $\theta_{s2}$ = stick angle $- (90 - \phi_{boom})$ $A = L_s \cos \theta_{s2} = (L_B \sin \phi_{boom}) \cos(\text{stick angle} - (90 - \phi_{boom}))$ Therefore, $A = L_B \sin \phi_{boom} \cos \theta_{s2}$ $B_H = (L_B \sin \phi_{boom}) - A$ $B_H = (L_B \sin \phi_{boom})(1 - \cos \theta_{s2})$ The weight estimation is then triggered when the bucket reaches the desired bucket height.

The above process sets out the process for when relative angles between the boom, stick and load holder are measured. This assumes that the chassis is level. In a general case, the chassis might not be level. A tilt sensor can be placed on the chassis to determine tilt to the horizontal, and this information fed to the microprocessor. The sensor could be, for example sensor 13 shown in FIG. 1. The calculation process can then compensate for the tilt angle. The detected tilt angle can be subtracted from the measured boom, stick and bucket angles in the equations above, and the equations used as described before to determine and estimate of weight.

Further, the calculation process could compensate for slew. The angular velocity of the slewing cab is determined using sensors. In his embodiment, two tilt sensors are used. One is disposed at the centre of slewing rotation, e.g. sensor 13 in FIG. 1 so that it is not affected by centripetal force during slewing, and the other, e.g. sensor 13b in FIG. 1, at a known distance away from the centre which is affected by centripetal force. The difference in these two tilt angles can be detected and the angular velocity from derived this. The I/O controller receives the sense signals from the sensors, and the processor 31 uses them to compensate for slew.

More particularly, centripetal force on the Excavator's linkage/payload mass at the centre of mass is caused by the acceleration it experiences when during slewing about the slewing pivot. This acceleration is defined by:

$$a_c = \omega^2 r \qquad (31)$$

Where
$a_c$ = the centripetal acceleration
$\omega$ = angular velocity of the mass (rad/s)
$r$ = distance from centre of slewing pivot to the centre of mass, perpendicular to axis of rotation For an empty bucket, the acceleration component due to slewing which affects the torque required at the boom pivot to hold the linkage/bucket mass is defined by:

$$a_{ce} = a_c \sin \theta_{com_e} \qquad (32)$$

where $a_{ce}$ = the centripetal acceleration of an empty bucket
Therefore, substituting equation 31 into equation 32 we get, $$a_{ce} = \omega^2 r \sin \theta_{com_e} \qquad (33)$$

where $$r = \frac{\tau_e}{M_o g} \qquad (34)$$

so, $$a_{ce} = \omega^2 \frac{\tau_e}{M_o g} \sin \theta_{com_e} \qquad (35)$$

The extra torque at the boom pivot caused by this acceleration is defined by:

$$\tau_{a_{ce}} = M_o a_{ce} r \qquad (36)$$

so, $$\tau_{a_{ce}} = M_o \omega^2 \frac{\tau_e}{M_o g} \sin \theta_{com_e} \frac{\tau_e}{M_o g} \qquad (37)$$

and therefore, $$\therefore \tau_{a_{ce}} = \frac{\omega^2 \tau_e^2 \sin \theta_{com_e}}{M_o g^2} \qquad (38)$$

Similarly for a full bucket, $$\therefore \tau_{af} = \frac{\omega^2 \tau_f^2 \sin \theta_{com_f}}{(M_c + M_o) g^2} \qquad (39)$$

As a result the final weight calculation is:

$$M = \frac{(\tau - (\tau_e + \tau_{a_e} + \tau_{a_{ce}})) M_c}{(\tau_f + \tau_{a_f} + \tau_{a_{cf}}) - (\tau_e + \tau_{a_e} + \tau_{a_{ce}})} \qquad (40)$$

This can be used to estimate weight as described previously in relation to equation 1.

Figure 15:
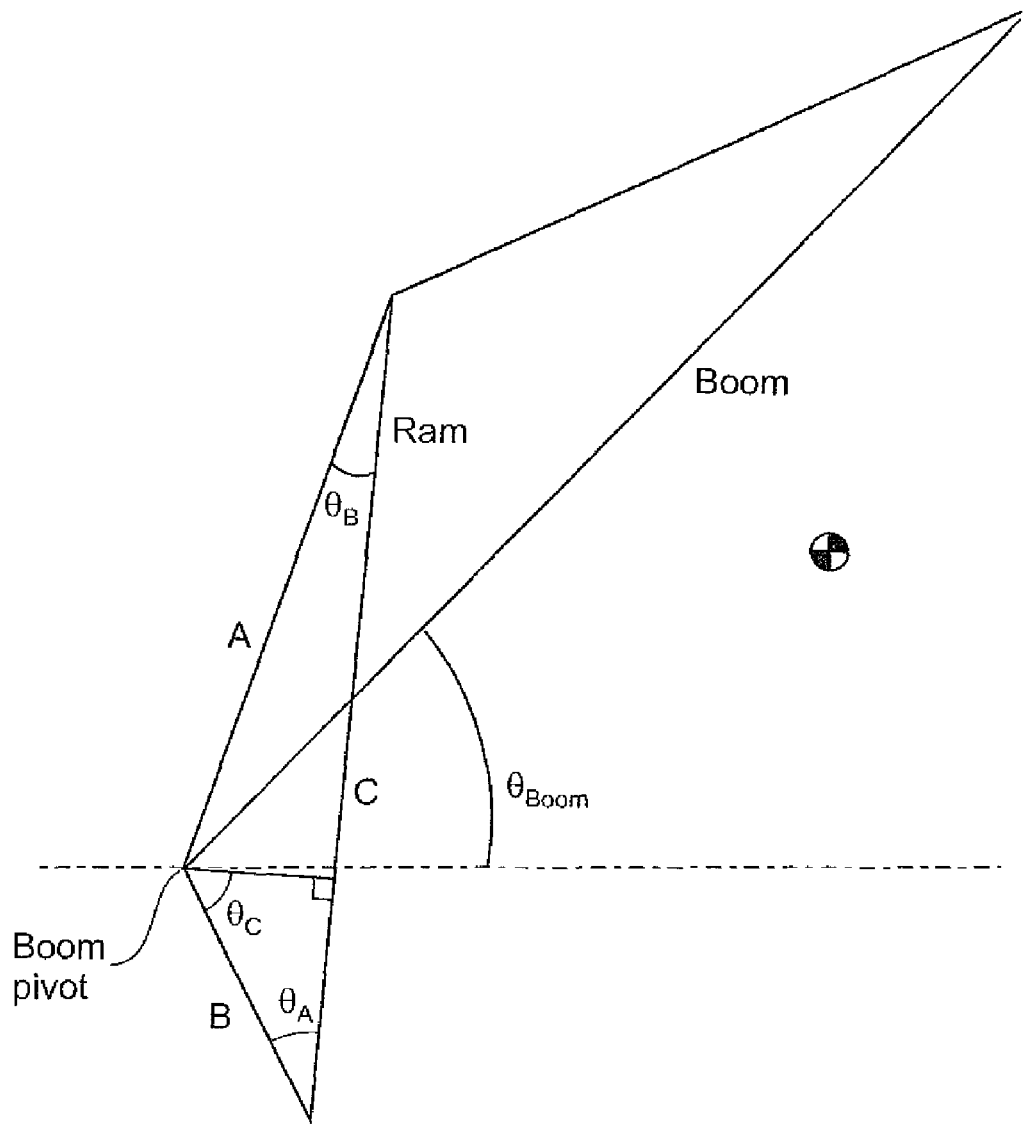
FIG. 15 shows a vector diagram for determining torque.

Referring to FIG. 15, the torque in the hydraulic ram 6 is calculated from the pressure sensors in the ram. First, the pressure is measured using the sensors 14, 15 in the hydraulic ram at various points during a lift. At each point the geometry of the three pivots of the linkage is obtained. The pressure measurements are then converted to torques using the ram pressure times ram area and the geometry of the linkage.

More particularly, $$\tau = Fd \quad (41)$$

Where F is force
d = A sin $\theta_B$ that is, the perpendicular distance to the centre of rotation
From the Sine rule $$\frac{\sin\theta_B}{B} = \frac{\sin\theta_c}{C} \quad (42)$$

Where boom moves $\theta_c = \theta_{c0} + \Delta\theta_{boom}$ $$\theta_B = \sin^{-1}\left[\frac{B}{C}\sin(\theta_{c0} + \Delta\theta_{boom})\right] \quad (43)$$
$$= \sin^{-1}\left[\frac{B\sin(\theta_{c0} + \Delta\theta_{boom})}{\sqrt{A^2 + B^2 - 2AB\cos(\theta_{c0} + \Delta\theta_{boom})}}\right]$$

So, $$\tau = F\left[\frac{AB\sin(\theta_{c0} + \theta_{boom} - \theta_{boom0})}{\sqrt{A^2 + B^2 - 2AB\cos(\theta_{c0} + \theta_{boom} - \theta_{boom0})}}\right] \quad (44)$$

Where
$\Delta\theta_{boom} = \theta_{boom} - \theta_{boom0}$.

It will be appreciated that while in the preferred embodiment, calibration lifts are done with an empty bucket and then a fall load, this is not essential. The calibration lifts could be done with any two differing payload masses. For example, a partially or almost full bucket could be used as a second payload as the calibration mass. A calibration torque profile would then be calculated for this which would become the calibration torque profile for a "full" holder. A partially or almost empty bucket could be used as a first payload. A calibration profile would then be calculated for this which would become the calibration torque profile for an "empty" holder. The bigger the difference in the payload masses, the more accurate the eventual results become. Preferably, the first payload is a mass less than the second payload. If general masses are used, the calibration torque profiles will be calculated in the same way. Preferably, the first payload mass is used in the first set of calibration lifts, and the second payload mass is used in the second set of calibration lifts. However, the order could be reversed. The use of the terms "first" and "second" payload is arbitrary, and they could be used other way around.

It will also be appreciated that during the first set of calibration lifts, and first set of bucket, stick and boom angles could be specified for the measurement points. Then, for the second set of calibration lifts, a different set of bucket, stick and boom angles could be specified for the measurement points. It is not essential for these angles to be the same across both sets of lifts.

It will also be appreciated that while particular types of sensors have been described, other sensor types could be used that obtain the required parameters. Various alternatives will be known to those skilled in the art.

The embodiments described above relate to a boom and stick each formed as a single rigid linkage element. It will be appreciated that booms and sticks can be each formed from two or more elements pivotably or otherwise coupled. The invention could be applied to such linkage arrangements. For example, where a multiple element boom or stick is used, the couplings linking the elements in the boom/stick could be locked to mimic a single rigid linkage element.

Weight Estimation for Grapple Load Holder

In an alternative embodiment, the load holder may take the form of a grapple 70 instead of a bucket. The same approach can be taken for estimating weight using equation 1 as described for the previous embodiment. Determining the parameters for equation 1 follows the same approach, although is simpler as described below.

Figure 17A:
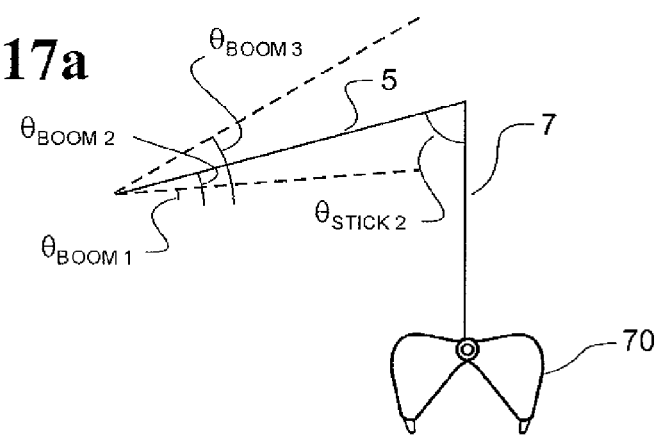
FIGS. 17a-17d show geometries of the excavator linkage during the calibration lifts for a grapple.
Figure 17B:
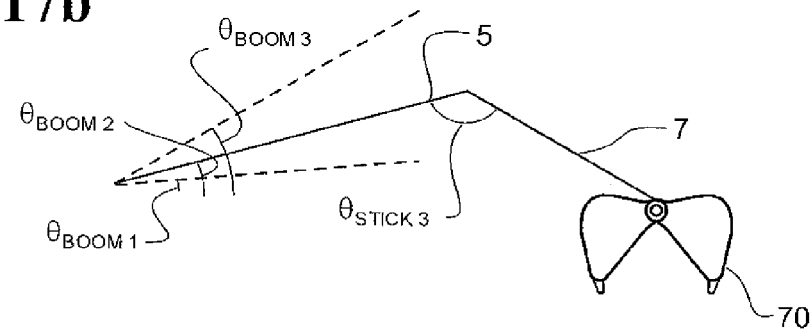
Figure 17C:
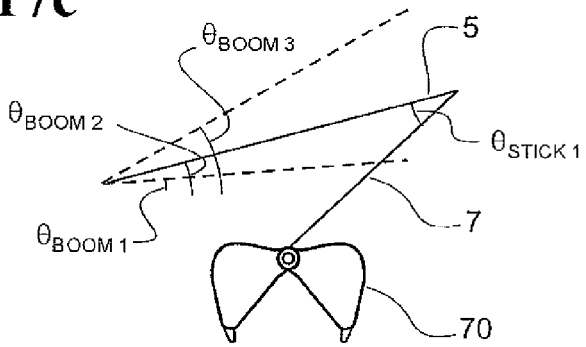
Figure 17D:
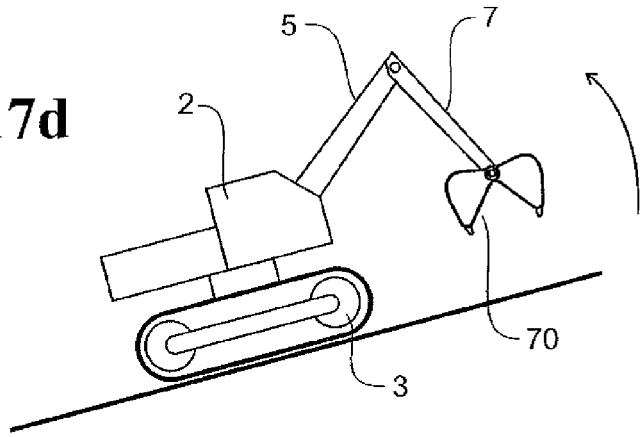

First, four calibration lifts are undertaken, as shown in FIG. 17a-17d. Only four lifts are needed because the grapple 70 always "hangs" and so its angle relative to the stick does not change. In the first lift as shown in FIG. 17a, the stick is vertical $\theta_{stick2}$ and the boom 5 is moved through three angles $\theta_{boom1}, \theta_{boom2}, \theta_{boom3}$ as per the previous embodiment, and a torque measurement taken at $\theta_{boom1}, \theta_{boom2}, \theta_{boom3}$. In the second lift (FIG. 17b), the stick is moved out $\theta_{stick3}$ and again the boom 5 is moved through three angles $\theta_{boom1}, \theta_{boom2}, \theta_{boom3}$ and a torque measurement taken at $\theta_{boom2}$. In the third lift (FIG. 17c), the stick is brought inwards $\theta_{stick1}$ and again the boom 5 is moved through three angles $\theta_{boom1}, \theta_{boom2}, \theta_{boom3}$ and a torque measurement taken at $\theta_{boom2}$. Finally, the excavator is put on a tilt, and one slow lift is performed to determine the contribution of the grapple to the centre of mass position (FIG. 17d).

The general curve fitting equation for determining the parameters of equation 1 from the calibration lifts is substantially the same as for the bucket load holder. The torque profiles for empty and full grapple loads are as follows:

$$\tau = A_{grapple}\sin(\theta_{grapple} - \theta_{0grapple} + \Delta\theta_{stick} + \Delta\theta_{boom}) + A_{stick}\sin(\theta_{stick} - \theta_{0stick} + \Delta\theta_{boom}) + A_{boom}\sin(\theta_{boom} - \theta_{0boom}) + B_{boom} \quad (45)$$

except that the bucket term effectively always equates to zero $$(\theta_{grapple} - \theta_{0grapple} + \Delta\theta_{stick} + \Delta\theta_{boom} = 0) \quad (46)$$

as the grapple is always hanging vertically and the torque component of the grapple mass does not change when the grapple length changes. Therefore one can perform 3 lifts at different stick angles and determine the required parameters in the following without regard for the bucket angle:

$$\tau = A_{stick}\sin(\theta_{stick} - \theta_{0stick} + \Delta\theta_{boom}) + A_{boom}\sin(\theta_{boom} - \theta_{0boom}) + B_{boom} \quad (47)$$

These parameters once again provide the torque profile of the system under any static geometry.

For dynamic torque adjustments however, the $A_{grapple}$ term is required because to find the position of the centre of mass (in order to calculate the dynamic torque due to acceleration), $$\theta_{com} = \tan^{-1}\left(\frac{y_{com}}{x_{com}}\right) \quad (48)$$

where $$x_{com} = \tau \quad (49)$$
$$= A_{grapple}\sin(0) + A_{stick}\sin(\theta_{stick} - \theta_{0stick} + \Delta\theta_{boom}) + A_{boom}\sin(\theta_{boom} - \theta_{0boom}) + B_{boom}$$

and $$y_{com} = A_{grapple}\cos(0) + A_{stick}\cos(\theta_{stick} - \theta_{0stick} + \Delta\theta_{boom}) + A_{boom}\cos(\theta_{boom} - \theta_{0boom}) + B_{boom} \quad (50)$$

To find the $A_{grapple}$ term, we can simply tilt the excavator to a known angle, then perform a lift and compare the actual torque to the estimated one (calculated from equation 2 with tilt compensation).

This results in:

$$A_{grapple} = \frac{\tau_{actual} - \tau_{estimated}}{\sin(\theta_{tilt})} \quad (51)$$

From these parameters, equation 1 can be generated for use by the controller to estimate weights.

The invention claimed is:

1. A method for estimating weight of a payload held by load lifting machine, wherein the load lifting machine comprises lifting linkage with a boom pivotably connected to a machine chassis, a stick pivotably connected to the boom and a load holder for a payload pivotably connected to the stick, the boom, stick and load holder being moveable into a range of boom, stick and load holder angles, the method comprising the steps of:
   a) at a first linkage geometry:
      i) determining a first torque parameter being a torque or a parameter indicative of torque between the boom and the chassis during boom movement, and
      ii) determining a current boom angle, a current stick angle and a current load holder angle,
      iii) determining a second torque parameter being a torque or a parameter indicative of a torque between the boom and the chassis that is generated by acceleration of the centre of mass of the lifting linkage when the load holder has a first payload, and
      iv) determining a third torque parameter being a torque or a parameter indicative of a torque between the boom and the chassis that is generated by acceleration of the centre of mass of the lifting linkage when the load holder has a second payload,
   b) estimating a payload weight by:
      i) determining a relationship between the first torque parameter and at least two corresponding calibration torque parameters determined during a calibration process, each corresponding calibration torque parameter being a torque or a parameter indicative of torque between the boom and the chassis at the current boom, stick and load holder angles, wherein determining the relationship further comprises compensating for the torque generated by acceleration of the centre of mass of the lifting linkage using the second and third determined torque parameters, and
      ii) using the relationship and a mass of a calibration payload to calculate a payload weight estimation,
   wherein the steps are performed by a processor.

2. A method according to claim 1 wherein further comprising determining a tilt angle of the chassis, and adjusting the determined boom, stick and bucket angles to compensate for the tilt angle.

3. A method according to claim 2 wherein the boom, stick and load holder angles are measured by one or more angle sensors, or one or more of the boom, stick and load holder angles are determined or calculated from other parameters.

4. A method according to claim 3 wherein there is a first and second corresponding calibration torque parameter determined during a calibration process, wherein the first corresponding calibration torque parameter is a torque or a parameter indicative of torque between the boom and the chassis at the current boom, stick and load holder angles during a calibration process with the first payload in the load holder, and wherein the second corresponding calibration torque parameter is a torque or a parameter indicative of torque between the boom and the chassis at the first boom, stick and load holder angles during a calibration process with the second payload in the load holder.

5. A method according to claim 4 wherein the first payload has a mass less than the second payload or more preferably, the second payload is a full payload such that the load holder is loaded, and the first payload is an empty load holder wherein the load holder has no payload, or more preferably, the second payload is the calibration payload, or the second payload could have a mass less than the first payload.

6. A method according to claim 5 wherein further comprising:
   c) at each of a plurality of further linkage geometries:
      i) determining a fourth torque parameter being a torque or a parameter indicative of torque between the boom and the chassis during boom movement,
      ii) determining a current boom angle, a current stick angle and a current load holder angle,
      iii) determining a fifth torque parameter being a torque or a parameter indicative of a torque between the boom and the chassis that is generated by acceleration of the centre of mass of the lifting linkage when the load holder has a first payload, and
      iv) determining a sixth torque parameter being a torque or a parameter indicative of a torque between the boom and the chassis that is generated by acceleration of the centre of mass of the lifting linkage when the load holder has a second payload,
   and
   d) estimating a payload weight by:
      i) determining a relationship between the fourth torque parameter and at least two corresponding calibration torque parameters determined during a calibration process, each corresponding calibration torque parameter being a torque or a parameter indicative of torque between the boom and the chassis at the current boom, stick and load holder angles, wherein determining the relationship further comprises compensating for the torque generated by acceleration of the centre of mass of the lifting linkage using the fifth and sixth determined torque parameters, and
      ii) using the relationship and a mass of a calibration payload to calculate a payload weight estimation,
   and
   e) calculating an average estimate payload weight.

7. A method according to claim 6 wherein further comprising the steps of conducting a calibration process, the calibration process comprising the steps of:
   a) during conducting a plurality of calibration lifts with a first payload in the load holder, measuring a plurality of calibration torque parameters for the load holder with the first payload, each being a torque or a parameter indicative of torque between the boom and the chassis, each calibration torque parameter being measured at a boom, stick and load holder angle,
   b) determining a range of calibration torque parameters for a load holder with a first payload for a range of boom, stick and load holder angles from the plurality of measured calibration torque parameters for a load holder with a first payload,
   c) during conducting a plurality of calibration lifts with a second payload in the load holder, measuring a plurality of calibration torque parameters for the load holder with the second payload, each being a torque or a parameter indicative of torque between the boom and the chassis, each calibration boom parameter being measured at a boom, stick and load holder angle, and d) determining a range of calibration torque parameters for a load holder with a second payload for a range of boom, stick and load holder angles from the plurality of measured calibration torque parameters for a load holder with a first payload.

8. A method according to claim 7 wherein the first payload has a mass less than the second payload or more preferably, the second payload is a full payload such that the load holder is loaded, and the first payload is an empty load holder wherein the load holder has no payload or more preferably, the second payload is the calibration payload or the second payload could have a mass less than the first payload.

9. A method according to claim 8 wherein determining a range of calibration torque parameters for the loaded and the empty load holder comprises the steps of curve fitting the plurality of measured calibration torque parameters to a mathematical relationship relating torque parameters to boom, stick and load holder angles.

10. A method according to claim 9 wherein the mathematical relationship is a sine wave.

11. A method according to claim 10 wherein the boom angle is the angle between a line extending vertically perpendicularly from the chassis and a line extending through the longitudinal axis of the boom.

12. A method according to claim 11 wherein the first boom angle is set as a trigger point for triggering the weight estimation calculation steps of the method, or a load holder position is a trigger point for triggering the weight estimation calculation steps.

13. A method according to claim 12 wherein the boom angle is the relative angle between the boom and chassis or a parameter indicative of the relative orientations of the boom and chassis, or it is an absolute angle between the boom and vertical.

14. A method according to claim 13 wherein the stick angle is the relative angle between the stick and boom or parameter indicative of the relative orientations of the stick and the chassis, or it is an absolute angle between the stick and vertical.

15. A method according to claim 14 wherein the load holder angle is the relative angle between the load holder and stick or a parameter indicative of the relative orientations of the load holder and chassis.

16. A method according to claim 15 wherein the parameters for determining calibration torque profiles are measured and/or determined from the calibration lifts.

17. A method according to claim 16 wherein the method comprises adjusting the weight estimation for chassis tilt, using an indication of chassis tilt from a sensor.

18. A method according to claim 17 wherein the weight estimate can be compensated for the effects of slew.

19. A method according to claim 18 wherein the weight estimation method can be triggered when the bucket reaches a particular height.

20. An apparatus for estimating weight of a load held by load lifting machine, wherein the load lifting machine comprises lifting linkage with a boom pivotably connected to a machine chassis, a stick pivotably connected to the boom and a load holder pivotably connected to the stick, the boom, stick and load holder being moveable into a range of relative boom, stick and load holder angles, the apparatus incorporated into or adapted to be installed on a load lifting machine and comprising:

a processor, a first input coupled to the processor for receiving a signal indicative of a torque or a parameter indicative of or from which can be calculated torque between the boom and the chassis during boom movement, a boom angle input coupled to the processor for receiving a signal indicative of an angle between the boom and a first reference, a stick angle input coupled to the processor for receiving a signal indicative of an angle between the boom and a second reference, and a load holder angle input coupled to the processor for receiving a signal indicative of an angle between the stick and a third reference, wherein the processor is adapted to detect movement of the boom, stick and/or load holder through a range of boom angles and is programmed to:

a) at a first linkage geometry:
  i) determine a first torque parameter being a torque or a parameter indicative of torque between the boom and the chassis during boom movement from a signal on the first input,
  ii) determine a current boom angle, a current stick angle and a current load holder angle from signals on the boom, stick and load holder angle inputs, and
  iii) determine a second torque parameter being a torque or a parameter indicative of a torque between the boom and the chassis that is generated by acceleration of the centre of mass of the lifting linkage when the load holder has a first payload, and
  iv) determine a third torque parameter being a torque or a parameter indicative of a torque between the boom and the chassis that is generated by acceleration of the centre of mass of the lifting linkage when the load holder has a second payload, b) estimate a payload weight by:
  i) determining the relationship between the first torque parameter and at least two corresponding calibration torque parameters determined during a calibration process, each corresponding calibration torque parameter being a torque or a parameter indicative of torque between the boom and the chassis at the current boom, stick and load holder angles, wherein determining the relationship further comprises compensating for the torque generated by acceleration of the centre of mass of the lifting linkage using the second and third determined torque parameters, and
  ii) using the relationship and a mass of a calibration payload to calculate a payload weight estimation.

21. An apparatus according to claim 20 wherein the first payload has a mass less than the second payload, or the second payload is a full payload such that the load holder is loaded, and the first payload is an empty load holder wherein the load holder has no payload, the second payload is the calibration payload, or the second payload could have a mass less than the first payload.

22. An apparatus according to claim 21 wherein the apparatus further comprises a sensor coupled to the first input for sensing torque of the boom, or sensing a parameter from which torque can be calculated.

23. An apparatus according to claim 22 wherein the apparatus further comprises angle sensors coupled to or for coupling to the boom, stick and load holder angle inputs for measuring the respective boom, stick and load holder angles, or the load holder angle could be determined in another manner.

24. An apparatus according to claim 23 wherein there is a first and second corresponding calibration torque parameter determined during a calibration process, wherein the first corresponding calibration torque parameter is a torque or a parameter indicative of torque between the boom and the chassis at the current boom, stick and load holder angles during a calibration process with a first payload in the load holder, and wherein the second corresponding calibration torque parameter is a torque or a parameter indicative of torque between the boom and the chassis at the first boom, stick and load holder angles during a calibration process with the calibration payload in the load holder.

25. An apparatus according to claim 24 wherein the processor is further programmed to:
  c) at each of a plurality of further linkage geometries:
    i) determine a fourth torque parameter being a torque or a parameter indicative of torque between the boom and the chassis during boom movement,
    ii) determine a current boom angle, a current stick angle and a current load holder angle,
    iii) determine a fifth torque parameter being a torque or a parameter indicative of a torque between the boom and the chassis that is generated by acceleration of the centre of mass of the lifting linkage when the load holder has a first payload, and
    iv) determine a sixth torque parameter being a torque or a parameter indicative of a torque between the boom and the chassis that is generated by acceleration of the centre of mass of the lifting linkage when the load holder has a second payload,
  d) estimate a payload weight by:
    i) determining a relationship between the first torque parameter and at least two corresponding calibration torque parameters determined during a calibration process, each corresponding calibration torque parameter being a torque or a parameter indicative of torque between the boom and the chassis at the current boom, stick and load holder angles, wherein determining the relationship further comprises compensating for the torque generated by acceleration of the centre of mass of the lifting linkage using the second and third determined torque parameters, and
    ii) using the relationship and a mass of a calibration payload to calculate a payload weight estimation, and
  e) calculate an average estimate payload weight.

26. An apparatus according to claim 25 wherein the first payload has a mass less than the second payload, or more preferably, the second payload is a full payload such that the load holder is loaded, and the first payload is an empty load holder wherein the load holder has no payload, or more preferably, the second payload is a calibration payload, or the second payload could have a mass less than the first payload.

27. An apparatus according to claim 26 wherein the apparatus further comprises an output device for displaying the calculated estimated weight.

28. An apparatus according to claim 27 wherein the boom angle is the relative angle between the boom and chassis or a parameter indicative of the relative orientations of the boom and chassis, or it is an absolute angle between the boom and vertical.

29. An apparatus according to claim 28 wherein the stick angle is the relative angle between the stick and boom or a parameter indicative of the relative orientations of the stick and the chassis, or it is an absolute angle between the stick and vertical.

30. An apparatus according to claim 29 wherein the load holder angle is the relative angle between the load holder and stick or an angle indicative of the relative orientations of the load holder and the chassis, or it is an absolute angle between the load holder and vertical.

31. An apparatus according to claim 30 wherein the parameters for determining calibration torque profiles are measured and/or determined from the calibration lifts.

32. An apparatus according to claim 31 wherein the method comprises adjusting the weight estimation for chassis tilt, using an indication of chassis tilt from a sensor.

33. An apparatus according to claim 32 wherein the weight estimate can be compensated for the effects of slew is based on information from sensors on the chassis.

34. An apparatus according to claim 33 wherein the weight estimation can be triggered when the bucket reaches a particular height.

35. A method for estimating weight of a payload held by load lifting machine, wherein the load lifting machine comprises lifting linkage with a boom pivotably connected to a machine chassis, a stick pivotably connected to the boom and a bucket for a payload pivotably connected to the stick, the boom, stick and bucket being moveable into a range of boom, stick and bucket angles, the method comprising the steps of:
  a) at a first linkage geometry:
    i) determining a first torque parameter being a torque or a parameter indicative of torque between the boom and the chassis during boom movement, and
    ii) determining a current boom angle, a current stick angle and a current load holder angle,
    iii) determining a second torque parameter being a torque or a parameter indicative of a torque between the boom and the chassis that is generated by acceleration of the centre of mass of the lifting linkage when the load holder has a first payload, and
    iv) determining a third torque parameter being a torque or a parameter indicative of a torque between the boom and the chassis that is generated by acceleration of the centre of mass of the lifting linkage when the load holder has a second payload,
  b) estimating a payload weight by:
    i) determining a relationship between the first torque parameter and at least two corresponding calibration torque parameters determined during a calibration process, each corresponding calibration torque parameter being a torque or a parameter indicative of torque between the boom and the chassis at the current boom, stick and load holder angles, wherein determining the relationship further comprises compensating for the torque generated by acceleration of the centre of mass of the lifting linkage using the second and third determined torque parameters, and
    ii) using the relationship and a mass of a calibration payload to calculate a payload weight estimation,
  wherein the steps are performed in a processor.

36. A method for estimating weight of a payload held by load lifting machine, wherein the load lifting machine comprises lifting linkage with a boom pivotably connected to a machine chassis, a stick pivotably connected to the boom and a grapple for a payload pivotably connected to the stick, the boom, stick being moveable into a range of boom and stick angles, the method comprising the steps of:
  a) at a first linkage geometry:
    i) determining a first torque parameter being a torque or a parameter indicative of torque between the boom and the chassis during boom movement, and ii) determining a current boom angle and a current stick angle,
iii) determining a second torque parameter being a torque or a parameter indicative of a torque between the boom and the chassis that is generated by acceleration of the centre of mass of the lifting linkage when the grapple has a first payload, and
iv) determining a third torque parameter being a torque or a parameter indicative of a torque between the boom and the chassis that is generated by acceleration of the centre of mass of the lifting linkage when the grapple has a second payload,
b) estimating a payload weight by:
i) determining a relationship between the first torque parameter and at least two corresponding calibration torque parameters determined during a calibration process, each corresponding calibration torque parameter being a torque or a parameter indicative of torque between the boom and the chassis at the current boom and stick angles, wherein determining the relationship further comprises compensating for the torque generated by acceleration of the centre of mass of the lifting linkage using the second and third determined torque parameters, and
ii) using the relationship and a mass of a calibration payload to calculate a payload weight estimation,
wherein the steps are performed in a processor.

* * * * *